United States Patent [19]

Anderson et al.

[11] 4,319,336

[45] Mar. 9, 1982

[54] TRANSACTION EXECUTION SYSTEM WITH IMPROVED KEY FUNCTION

[75] Inventors: Robert W. Anderson, Morgan Hill; May L. Gee, San Jose; Alice K. McMullen, Campbell, all of Calif.

[73] Assignee: International Business Machines Corporation, Armonk, N.Y.

[21] Appl. No.: 9,384

[22] Filed: Feb. 2, 1979

[51] Int. Cl.³ .................. G06F 3/023; G06F 3/04
[52] U.S. Cl. ............................ 364/900; 364/200; 235/380
[58] Field of Search ............... 340/149 A, 152; 235/379–381, 431; 364/200 MS File, 900 MS File, 400, 401, 406, 465

[56] References Cited

U.S. PATENT DOCUMENTS

| | | | |
|---|---|---|---|
| 3,648,020 | 3/1972 | Tateisi et al. | 340/149 A |
| 3,727,186 | 4/1973 | Stephenson, Jr. et al. | 340/149 A |
| 3,833,885 | 9/1974 | Gentile et al. | 340/152 R |
| 3,852,271 | 12/1974 | Hall et al. | 235/379 |
| 3,931,497 | 1/1976 | Gentile et al. | 235/384 |
| 3,937,925 | 2/1976 | Boothroyd | 235/379 |
| 3,938,090 | 2/1976 | Borison et al. | 340/149 A |
| 3,941,977 | 3/1976 | Voss et al. | 235/61.7 B |
| 3,943,335 | 3/1976 | Kinker et al. | 235/381 |
| 3,956,615 | 5/1976 | Anderson et al. | 235/379 |
| 3,970,992 | 7/1976 | Boothroyd et al. | 364/900 |
| 4,004,134 | 1/1977 | Hwang | 235/431 |
| 4,023,013 | 5/1977 | Kinker | 235/379 |
| 4,023,014 | 5/1977 | Goldberg | 235/380 |
| 4,025,760 | 5/1977 | Trenkamp | 235/431 |
| 4,032,931 | 6/1977 | Haker | 340/149 A |
| 4,075,460 | 2/1978 | Gorgens | 235/420 |
| 4,085,446 | 4/1978 | Nagamura | 364/900 |
| 4,091,448 | 5/1978 | Clausing | 364/200 |
| 4,114,027 | 9/1978 | Slater et al. | 340/149 A |
| 4,117,542 | 9/1978 | Klausner et al. | 364/900 |
| 4,134,537 | 1/1979 | Glaser et al. | 235/381 |
| 4,186,871 | 2/1980 | Anderson et al. | 235/380 |

Primary Examiner—Harvey E. Springborn
Attorney, Agent, or Firm—Shelley M. Beckstrand

[57] ABSTRACT

A transaction execution is provided in which key initiated transaction requests at a terminal remote from and in communication with a host data processing system are processed at the terminal under the selective control of the host. Each active transaction key at the terminal keyboard is assigned one of three different states by a financial institution table. The table provides keyboard customization by selecting one of a plurality of different groups of key states for the different keys arrived at by combining the key states in a custom key set table with the states in a base key set table in response to information from a credit card entered by a consumer. Transactions requested by keys assigned a standard state are processed at the terminal without further data input being required of the customer. Transactions requested by keys having a data entry state are also handled within the terminal and with the additional consumer entered data required to complete the transaction being requested by and received by the terminal using sets of messages previously stored in the terminal by the hose data processing system. Transactions designated by an interactive key state take place within and involve interactive communication between both the terminal and the hose, enabling the responses and other communications generated by the host in connection with a transaction for a particular customer to be customized and providing for greater and more varied transactions including such things as bill paying in which funds are transferred between accounts in the host. Message storage within the terminal and communication of messages to the terminal from the host are greatly simplified by storage of segments of messages at the terminal. Frequently repeated phrases can then be incorporated into a message as it is readied for display at the terminal by storing the phrases as segments and thereafter simply identifying them in message definitions communicated to the terminal from the host or stored at the terminal.

7 Claims, 29 Drawing Figures

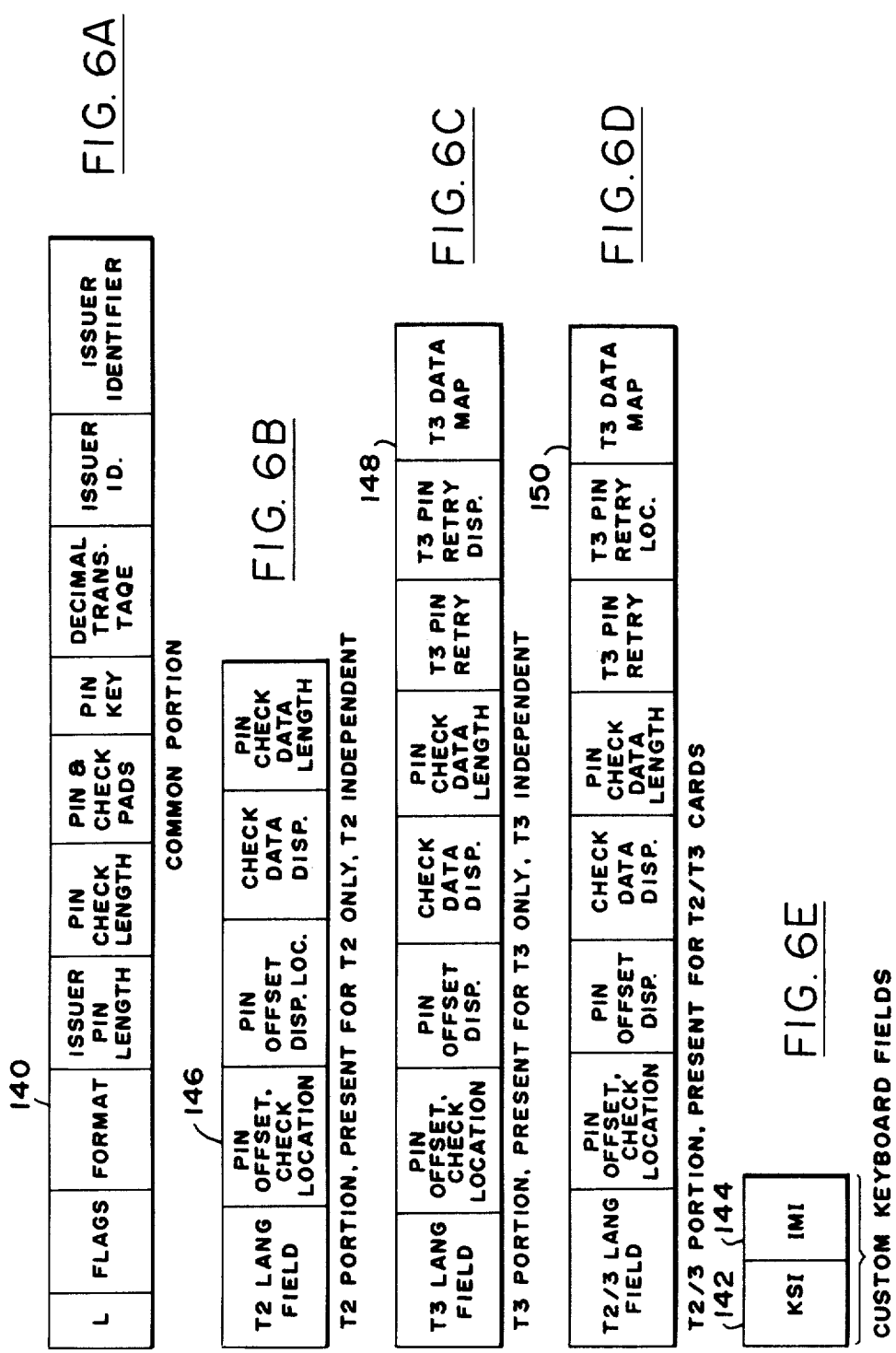

FIG. 7 KEY SET TABLE FORMAT

| 2 | 1 | 1 | 1 | 1 | 1 | VAR | ... | 1 | VAR |
|---|---|---|---|---|---|---|---|---|---|
| L | KSI | ACTIVE FUNC. KEYS | ACTIVE FA KEYS | ACTIVE TA KEYS | LK | KEY DEFINITION | ... | LK | KEY DEFINITION |

170 — 172 — 174 — 176 — 178 — 180 — 182

{ KEY DEF. 1 } { KEY DEF. 2 } ... { KEY DEF. N }

FIG. 8 KEY DEFINITION FORMAT

| 1 | 1 | 1 | 1 | 1 | 2 | 1 | 1 | 1 | 1 | 1 | 1 | ... | 1 | 1 |
|---|---|---|---|---|---|---|---|---|---|---|---|---|---|---|
| LK | KEY ID | ALT KEY CODE | KEY FLAG | MSG FLAG | MIN CDEL | MAX CDEL | LP | PAGE FLAG | PAGE ID | PAGE FLAG | PAGE ID | ... | PAGE FLAG | PAGE ID |

180 — 184 — 182 — 186 — 188 — 190 — 192 — 194 — 196 — 198 — 200

{ REQUIRED FOR DATA ENTRY STATE ONLY }

{ DISPLAY PAGE 1 } { DISPLAY PAGE 2 } ... { DISPLAY PAGE M }

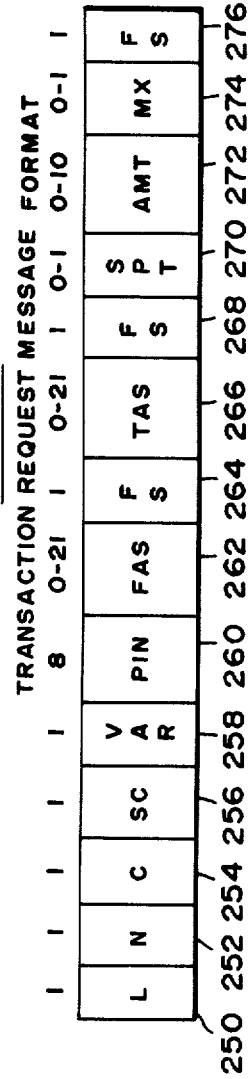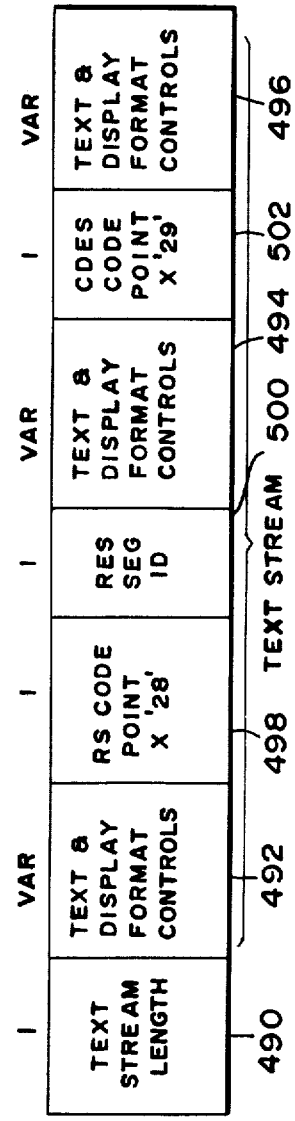

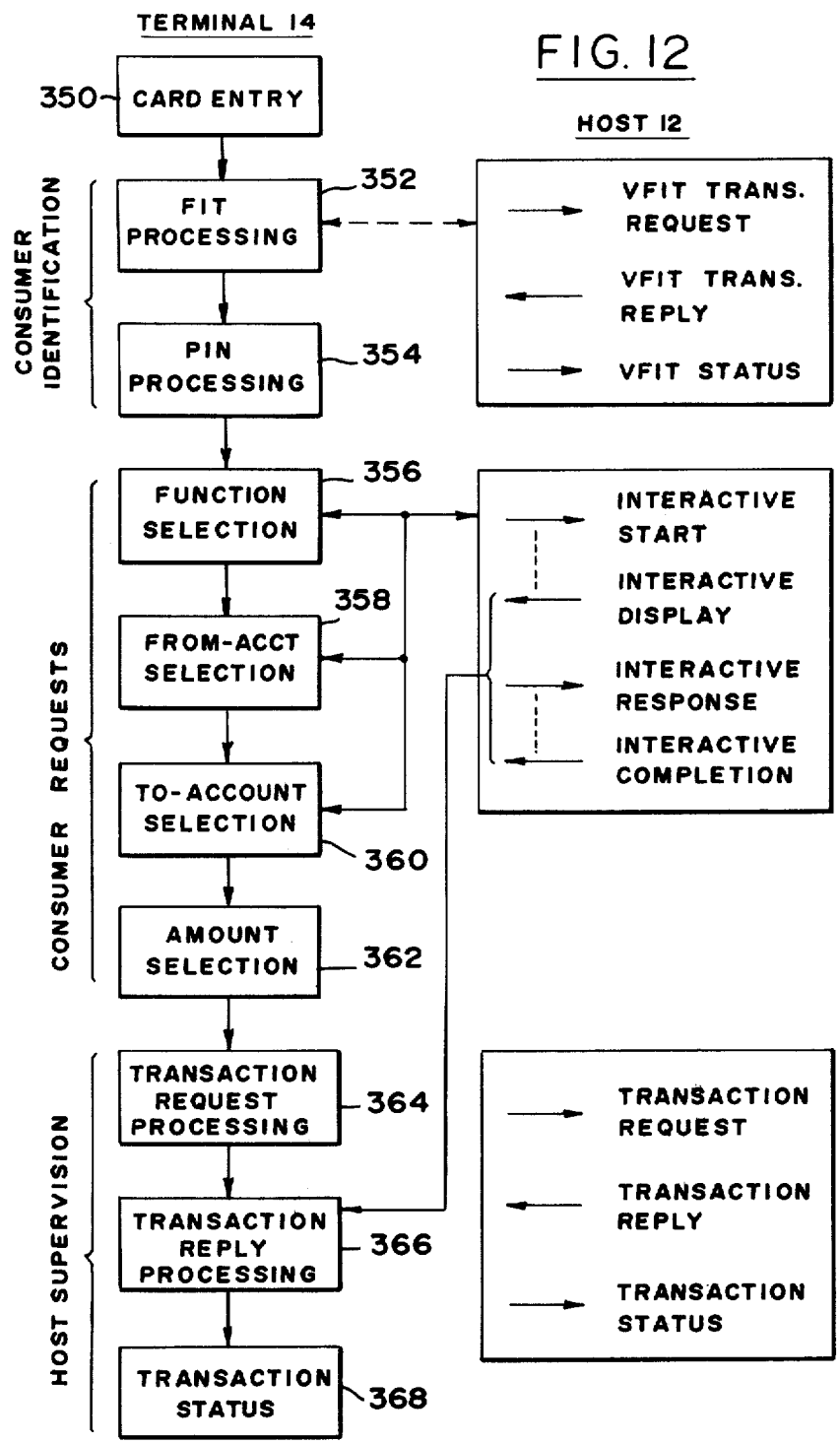

FIG.13
INTERACTIVE START MESSAGE TO HOST

| L S N | C S C | V A R | TSN | PIN | PIN TRY | FLAG | TRANS SC | INTERACTIVE KEY | LID- IMI | F S | T-2 DATA | F S | T-3 MAP | T-3 DATA | F S |
|---|---|---|---|---|---|---|---|---|---|---|---|---|---|---|---|
| 1 | 1 | 1 | 4 | 8 | 1 | 2 | 1 | 1 | 2 | 1 | 0-19 | 1 | 2 | 0-52 | 1 |

380 / 382 / 384 / 386 / 388 / 390 / 392 / 394 / 396 / 398 / 400 / 402 / 404 / 406 / 408 / 410 / 412 / 414

FIG.14
INTERACTIVE DISPLAY MESSAGE TO TERMINAL

| L | I S N | C S C | V A R | ID MSG FLAG | MIN CDEL | MAX CDEL | LP | PAGE FLAG | PAGE DATA | ... | PAGE FLAG | PAGE DATA | L V S | L V |
|---|---|---|---|---|---|---|---|---|---|---|---|---|---|---|
| 1 | 1 | 1 | 1 | 2 | 1 | 1 | 1 | 1 | VAR | | 1 | VAR | 1 | 1 |

440 / 442 / 444 / 446 / 448 / 450 / 452 / 454 / 456 / 458 / 460 / 462 / 464

PAGE 1 ... PAGE N

| VALIDATION DATA | L S | SUBSTITUTION DATA | P A D |
|---|---|---|---|
| VAR | 1 | VAR | |

466 / 468 / 470

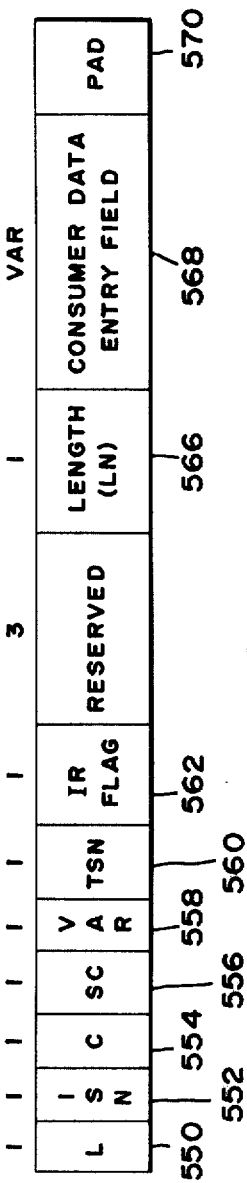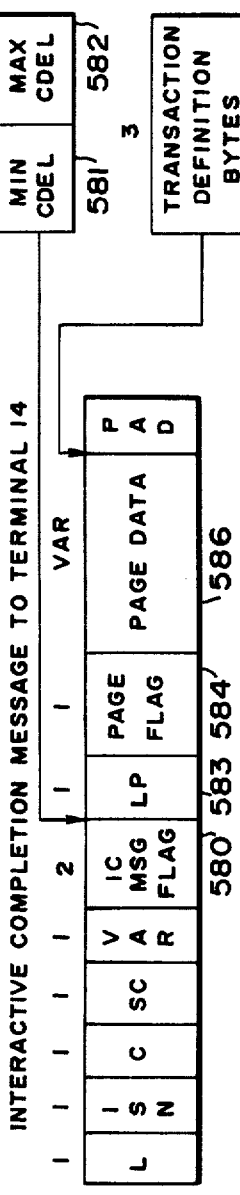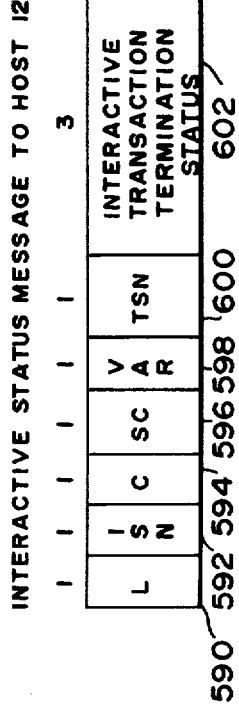

FIG. 21

CHANGE DISPLAY MESSAGE COMMAND FORMAT

| L | N | C | SC | C2 | C/SC | CI | SPEC | MN | ML | MSG | FLAG | IMI |
|---|---|---|----|----|------|----|------|----|----|-----|------|-----|
| 750 | 752 | 754 | 756 | 758 | 760 | 762 | 764 | 766 | 768 | 770 | 772 | 774 |

VAR

FIG. 22

| L (16) | NP | RS | I | CDES | NL | RS 3 | RS 6 | RS 5 | RS 4 | RS | 2 |
|--------|----|----|----|------|-----|------|------|------|------|----|----|
| 800 | 802 | 804 | 806 | 808 | 810 | | | | | | |

TRANSACTION EXECUTION SYSTEM WITH IMPROVED KEY FUNCTION VERSATILITY

BACKGROUND OF THE INVENTION

1. Field of the Invention

This invention relates to transaction execution systems, and more particularly to such systems having a central data base at a host data processing system in communication with remote terminals to permit the execution of transactions such as the issuance of cash or the inter-account transfer of funds in response to entry of a personal identification number together with a machine-readable identification card issued by any one of a plurality of cooperating institutions.

2. History of the Prior Art

Transaction execution systems which enable the performance of transactions such as cash issuance at terminals remote from and in communication with a host data processing system having a central data base in which account and other information is stored are well known. Examples of such systems are provided by U.S. Pat. No. 3,956,615 of Anderson et al, U.S. Pat. No. 3,970,992 of Boothroyd et al, U.S. Pat. No. 3,937,925 of Boothroyd, U.S. Pat. No. 3,931,497 of Gentile et al, U.S. Pat. No. 4,004,134 of Hwang, U.S. Pat. No. 4,023,014 of Goldberg, U.S. Pat. No. 4,025,760 of Trenkamp, U.S. Pat. No. 4,023,013 of Kinker, U.S. Pat. No. 3,727,186 of Stephenson, Jr., et al, U.S. Pat. No. 4,091,448 of Clausing, and U.S. Pat. No. 4,186,871 of Anderson et al.

The various transaction execution systems described in the above-noted patents and application constitute a variety of different approaches to the problem of providing a secure and yet versatile transaction to take place at any one of the terminals remote from the host data processing system. For example, in U.S. Pat. No. 3,956,615 of Anderson et al which is commonly assigned with the present application, various transactions are performed at the terminal upon verification of the propriety of the transaction and the authenticity of the consumer based on entry of a credit card identifying the consumer and an issuing financial institution and entry of a personal identification number (PIN) by the consumer. The system verifies the personal identification number with identification information on the credit card using an encryption code determined by the financial institution identified by the card. In an improvement on that system which is described in U.S. Pat. No. 4,186,871 of Anderson et al, the host data processing system includes a virtual financial institution table (VFIT). Upon entry by a consumer of a credit card and personal identification number the financial institution table (FIT) within the terminal is searched in an attempt to locate an entry corresponding to the institution identified by the credit card. If a corresponding entry is located, data from the fields for that entry is used to encrypt the personal data from the credit card for purposes of verification of the personal identification number entered by the consumer. If a corresponding entry is not located in the financial institution table, a search of the virtual financial institution table at the host is made. If a corresponding entry is located in the virtual financial institution table, the included data is communicated back to the terminal where it is used in the verification of the personal identification number. The Clausing patent provides an example of a system where time sharing of a central processor or a local processor serving one or a handful of terminals it utilized to execute transaction requests. In the former case transactions are executed at the central processor on an on-line basis, while in the latter case transactions are executed at the regional or local processor on an off-line basis.

Transaction execution systems provide one solution to the persistent problem of how to provide the customers of a financial institution with more functions without substantially increasing costs. Such systems attempt to solve this problem by automating simple functions like cash withdrawal, deposit and the like so as to reduce the time that the customer must spend with a teller. This reduces the number of tellers an institution needs, and accordingly the costs. If the transaction execution system can provide enough functions, it can even reduce the number of branches of the financial institution which are needed, in addition to extending the institution's banking hours for normal transactions without actually increasing the number of hours that the buildings themselves must be kept open.

Considering these objectives present transaction execution systems suffer from a number of limitations which limit their versatility and applicability to a variety of different situations. For example, conventional systems are limited in the number and types of functions that they can perform. Transactions such as bill paying which require transfer of funds between accounts are extremely difficult if not impossible to perform. Further problems arise from the fact that a financial institution wishing to enable its customers to perform functions different from those permitted by other institutions sharing the same system must typically acquire its own terminal system including controller. This is quite wasteful when it is considered that a number of financial institutions can otherwise share the same terminal system by accepting a standard set of key functions and display messages. The key functions themselves are limited so that even in instances where an institution can customize the available transactions and messages the number and types of functions are still unduly limited. Most systems limit performance of the functions to the terminal level, and in the process fail to provide the type of communication with the terminal or information storage within the terminal which enables such things as repeated interchange of data requests and data entries between the terminal and attached consumer operated keyboards, displays customized for a particular institution or customer and other activities capable of customization for the institution or consumer. Those conventional systems which permit communication between the terminal and the host data processing system during execution of the transactions tend to limit the interchange of information between the two because of such things as time and storage constraints so as to again limit the type and variety of functions capable of being performed. One such problem relates to the transmission of lengthy display messages from the host to the terminal during transaction execution. Because of this problem a number of predetermined standard messages must typically be stored in the terminal during initialization of the system, with the system thereafter relying on the standard messages stored in the terminal for communication with the consumer during execution of the transactions. In such systems the ability to communicate between the host and the consumer on a going, on-line basis and to compose messages custom-designed for a particular consumer or institution is lacking.

Accordingly, it is an object of the invention to provide an improved transaction execution system.

It is a further object of the invention to provide a transaction execution system capable of greater and more varied functions. This object includes the ability to provide a variety of diverse functions to be performed at the terminal complete with a full interchange of data between the terminal and consumer, as well as the ability to utilize the host data processing system when necessary to accomplish certain functions.

Further objects in accordance with the invention include the ability to customize functions for each of a plurality of different financial institutions sharing the same terminal system, and the ability to customize display messages to a particular consumer during various transactions.

Still further objects in accordance with the invention include the ability to communicate messages between the host and the terminal in simplified form so as to minimize the transmission time involved in addition to the storage space required, particularly at the terminal where messages are desirably stored for use in providing displays to consumers as needed.

BRIEF DESCRIPTION OF THE INVENTION

The present invention provides an improved transaction execution system in which institutional key-initiated transactions and responses to individual consumers can be customized and in which a variety of diverse transactions can be performed at the terminal level or with the active participation of the host data processing system using a minimum of communications and storage for multiline, customized messages. Customization of the keyboards of each financial institution sharing a terminal with other institutions is made possible by a terminal arrangement which stores control blocks containing fields of data unique to each of the various institutions sharing the terminal. The control blocks comprise entries in a financial institution table which correspond to customer identification data provided by an inserted credit card linking the consumer to a particular institution. Each entry includes a field defining a key set identifier associated with a particular institution. The key set identifier selects a corresponding one of a plurality of different key set tables used to determine the states of the various keys of the keyboard entries to the terminal for the institution. The key set tables includes a base key set table storing a standard set of states for the various keys and may include one or more custom key set tables defining a different state than in the case of the base key set table for one or more of the various keys. The various different key states define whether each particular key is active or inactive and, if active, whether it is limited to a simple transaction at the terminal level or can comprise a more complex and versatile function either at the terminal or at the host level. Any time a custom key set table is selected by a key set identifier from the financial institution table, the states of the various keys for the corresponding institution are defined by logically combining the selected custom key set table with the base key set table such that any key states in the custom table are substituted for the state definitions for the same key or keys in the base table. Each custom key set table may also include a set of definitions at which keys are active and inactive, which set is different from and is logically combined with a base set of active/inactive definitions upon selection of the custom key set. In this way the keyboards of various institutions or pools of institutions sharing a terminal or common processor can be customized.

The key states which are possible for these keys defined as active rather than inactive include the standard, data entry and interactive states. In the standard state which is confined to execution at the terminal level, communication between the keyboard requesting a transaction and the terminal's processor is limited to verification of the authenticity of the consumer and communication of predefined keys from the keyboard to the terminal's processor. Following that, the terminal executes the transaction requested without further entry of data by the consumer and without display of messages requesting a response by the consumer.

The data entry key state differs from the standard state in enabling extensive and varied communication to occur between the consumer and the terminal following verification of the consumer's authenticity. The terminal selects from among a number of standard, predetermined messages previously stored therein so as to request data entry by the consumer, receive the entered data and, where appropriate, request and receive consumer verification of the consumer entered data upon display thereof by the terminal. The data entered by the consumer as a result of the transaction is stored in the terminal, from which it is transferred to the host at the end of the transaction.

Interactive keys involve repeated communication between the terminal and host with the host being utilized to determine the steps in executing the transaction and to compose messages communicated to the terminal for display to the consumer in connection with the execution of the steps. Involvement of the host and its included data base storing information with respect to various accounts provides for multi-account transactions such as bill paying where funds are transferred from one account to another within the system. Following entry of a credit card and verification of the consumer's authenticity, the consumer selects a function by pressing a key and the terminal responds by sending an interactive start message to the host. The host then sends an interactive display message to the terminal containing messages which are displayed to the consumer. Consumer responses to the messages are communicated to the host in an interactive response message. The host may send further display messages to the terminal in response to an interactive response message, or it may send an interactive completion message. The display messages sent to the terminal by the host may be custom designed by the host or selected from the standard messages stored in the terminal. The sequence of interactive messages beginning with the interactive start message, ending with the interactive completion message and involving one or more series of display and response messages in between occurs for an interactive function key and may thereafter be repeated for other interactive keys operated as part of the transaction such as the keys used to select an account for transfer of funds or the amount of the funds to be transferred. When actuation of the various selection keys for a given transaction is completed, the terminal sends a transaction request to the host containing any necessary data not already provided to the host. The host then sends a reply to the terminal, which may be followed by a status message to the host ending the transaction.

Communication of messages from the host to the terminal as well as storage of the messages in the terminal is greatly facilitated by a segmentation technique in which segments comprising commonly occurring portions of messages are stored in the terminal prior to execution of the various requested transactions. Each segment which typically comprises a plurality of displayable characters and format characters indicating the physical location of the displayable characters is stored in a segment table within the terminal. A typical display message includes displayable characters representing a unique or customized part of the message together with format characters defining the desired physical location of the displayable characters and an identification of one or more segments to be incorporated into the message. During display of a message stored at the terminal or sent to the terminal from the host, the displayable characters are displayed using a dot matrix or other appropriate character generation technique in conjunction with conventional multiline display apparatus. Each time a segment identifier is encountered within the message, character generation shifts to a segment table from which the various characters of the segment are converted into displayable characters using the format characters. Each message may also include one or more indicators of consumer entered data which cause the character generation process to shift to a table where consumer entered data is stored. In this way consumer entered data can be made a part of the display messages such as where verification of the consumer entered data is requested.

BRIEF DESCRIPTION OF THE DRAWINGS

In the accompanying drawings forming a material part of this disclosure:

FIGS. 6A-6E are diagrammatic representations of data stored in a financial institution table within the terminal of FIG. 1B;

FIG. 7 is a diagrammatic representation of a key set table within the terminal of FIG. 1B;

FIG. 8 is a diagrammatic representation of a key definition within the key set table of FIG. 7;

FIG. 9 is a diagrammatic representation of a transaction request message generated at the terminal in response to consumer activation of a transaction key in the arrangement of FIG. 1B;

FIG. 12 is an operational flow chart of the basic steps performed by the arrangement of FIG. 1B in executing an interactive key transaction;

FIG. 13 is a diagrammatic representation of an interactive start message from the terminal to the host data processing system in the arrangement of FIG. 1B;

FIG. 14 is a diagrammatic representation of an interactive display message from the host data processing system to the terminal in the arrangement of FIG. 1B;

FIG. 15 is a diagrammatic representation of page description fields within the interactive display message of FIG. 14;

FIG. 16 is a diagrammatic representation of an interactive response message from the terminal to the host data processing system in the arrangement of FIG. 1B;

FIG. 17 is a diagrammatic representation of an interactive completion message from the host data processing system to the terminal in the arrangement of FIG. 1B;

FIG. 18 is a diagrammatic representation of an interactive status message from the terminal to the host data processing system in the arrangement of FIG. 1B;

FIG. 21 is a diagrammatic representation of a change display message command from the host data processing system to the terminal in the arrangement of FIG. 1B;

FIG. 22 is a diagrammatic representation of a display message definition defining a particular display message;

INTRODUCTION

Figure 1A:
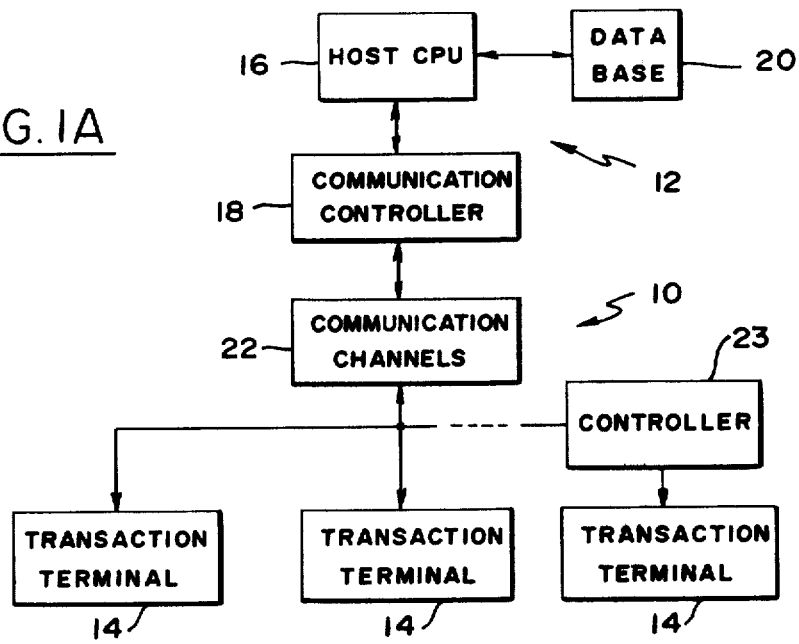
FIG. 1A is a block diagram of a transaction execution system in accordance with the invention.

Referring to FIG. 1A, a transaction execution system 10 in accordance with the invention includes a host data processing system 12 and a plurality of user transaction terminals 14 in communication therewith. The host data processing system 12 includes a host central processing unit 16 such as an IBM system 370, a communication controller 18 such as an IBM 3705 and a data base 20 which may include electrically alterable random access memory, magnetic tape transports, and magnetic disks. The host CPU 16 performs the arithmetic and logical operations which are required for controlling the operation of the host data processing system 12 and processing information which is received through the communication controller 18 or stored in the data base 20. The data base 20 stores information which is related to each customer of the host data processing system 12. For instance, for a banking customer, the data base 20 might store account information for a credit card, savings, checking or other accounts of the bank as well as payroll information and information relating to the financial status of the bank's operations. Each account might be typically addressable in accordance with an account number and have stored therein the current account information such as the current balance, a history of account transactions for a predetermined period of time, encoded personal I.D. numbers for persons who are authorized to use the account, a maximum credit limit, and any other information the bank may wish to store as part of an account. The communications controller 18 acts as an interface between the CPU 16 and a plurality of communication channels 22. The controller 18 arranges information received by the host 12 into a communication discipline and maintains communication synchronization.

The terminals 14 are shown connected directly to the communication channels 20 as via a cable or utility link. Alternatively one or more of the terminals can be coupled to the channels through a local controller 23 such as an IBM 3601 or 3602 having a communication loop as described in previously referred to U.S. Pat. No. 3,956,615 of Anderson et al, the teachings of which are incorporated herein by reference. Where a local controller such as the controller 23 is used, such local controller is capable of functioning in place of the host 12 such as in communicating with the terminal 14 during an interactive step as described hereafter. As such the controller 23 comprises a subhost, and the term "host" as used herein is deemed to include a subhost such as the controller 23 at the terminal end of the communication channels 22.

Figure 1B:
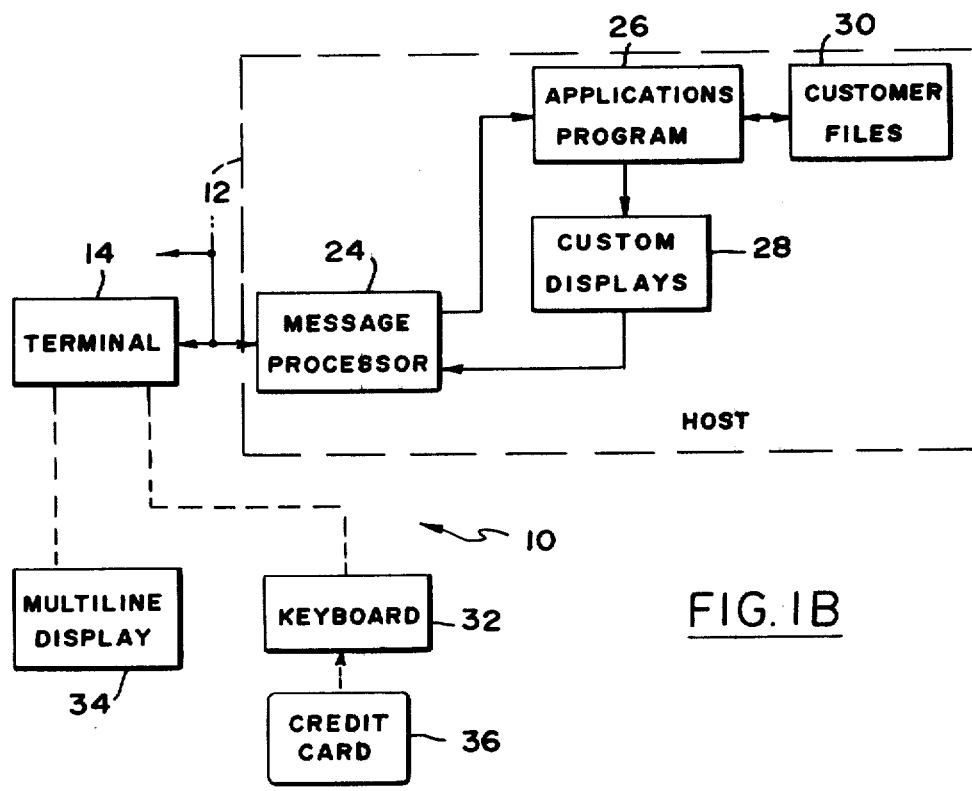
FIG. 1B is a more detailed block diagram of a transaction terminal and the host data processing system of the system of FIG. 1A.

FIG. 1B shows the transaction execution system 10 in somewhat greater detail. The host data processing system 12 is coupled to the various terminals 14 via a message processor 24 which is operative both to receive messages from the terminals and process them for presentation to an applications program 26 and to receive and process custom displays 28 from the applications program 26 for communication to one of the terminals 14. The data base 20 shown in FIG. 1A includes a plurality of customer files 30 as previously described, which files are available for use by the applications program 26.

One of the terminals 14 is shown in FIG. 1B as including a keyboard 32 and a multiline display 34. The keyboard 32 includes keys for requesting transactions and consumer entry of data in connection therewith. The keyboard 32 also includes a card reader capable of receiving a magnetically encoded credit card 36 for entry of both data personal to a particular consumer and data representing a particular financial institution with which the consumer is affiliated.

The previously referred to U.S. Pat. No. 3,956,615 of Anderson et al describes an arrangement for the secure storage and communication of data in which information identifying a particular consumer is encrypted. The encrypted data is compared with stored data within the system to verify the authenticity of the consumer. In an improvement on that system described in Anderson et al, U.S. Pat. No. 4,186,871, the terminal searches for an entry in a financial institution table based on data from the credit card identifying a particular financial institution. If a corresponding entry is found in the financial institution table, a corresponding key is used to encrypt an account number also taken from the credit card for purposes of comparison with a personal identification number entered by the consumer to verify the consumer's authenticity. If an entry corresponding to the financial institution cannot be found, a search of a virtual financial institution table in the host is made, and if the search is successful the corresponding key is communicated to the terminal for use in encrypting the account number.

In accordance with the present invention the host data processing system 12 and the various terminals 14 combine to provide more versatile and varied transactions both at the terminal and the host level as well as customization of the terminal keyboards and the messages displayed at the terminals. Customization of the various terminal keyboards such as the keyboard 32 is accomplished in response to data from the credit card 36 identifying a particular financial institution with which the consumer is affiliated. This data is used to identify a selected one of a plurality of different possible states for each of the keys in the keyboard 32. Different sets of key states can be used for different financial institutions, thereby providing for customization of the keyboard 32 for each particular institution.

Each key can have an active or an inactive state, and if active can be standard, data entry or interactive. If a key on the keyboard 32 actuated by the consumer is identified as having a standard state, the transaction is completed at the terminal 14 without participation by the host 12. The terminal 14 does not solicit or receive data from the consumer as part of the transaction.

In accordance with the invention one or more of the keys of the keyboard 32 may be identified as having a data entry state. When a data entry key is actuated, the terminal 14 responds by executing predetermined sequences of steps defined by data stored at the terminal. The steps include displaying predetermined messages to the consumer and receiving data entered by the consumer in response to the messages. Such data interchange usually includes a request by the terminal 14 to the consumer via the display 34 for entry by the consumer of data in connection with the transaction such as by selection of one of a number of choices presented by the display or entry of a dollar amount. Such further consumer data entry may be followed by a display to the consumer requesting verification of the data entered by the consumer and subsequent communication to the terminal 14 by the consumer of such verification. The terminal 14 executes a data entry key transaction utilizing a plurality of predetermined messages previously stored therein by the host 12. The messages together with the data defining the sequences of steps are typically loaded in the terminal 14 during initialization of the terminal by the host, and the host 12 is not thereafter involved in data entry key transactions until the consumer entered data has been collected and the terminal sends a transaction request to the host.

In accordance with the invention actuation of an interactive key on the keyboard 32 results in a transaction which is processed by the host 12 with the help of the terminal 14. As described hereafter direct involvement of the host 12 in such transactions greatly expands the types of transactions that can take place including those in which funds are transferred between different accounts stored in the data base 20. Thus, funds can be transferred between accounts of different consumers to effect bill paying, or can be transferred between two or more accounts of the same consumer such as where funds are to be transferred from the consumer's savings account to his checking account. Actuation of an interactive key at the keyboard 32 results in the terminal 14 communicating a start message for the transaction to the host 12. Upon determination by the applications program 26 that the transaction can be performed, the program 26 determines the interaction needed and communicates a series of display messages to the terminal. The program 26 generates the messages as custom displays 28. Unlike the predetermined messages stored in the terminal 14 and used in conjunction with data entry keys, the applications program 26 has the ability to generate custom displays for a particular transaction or for a particular consumer within a given transaction or transactions.

The terminal 14 responds to each message communicated thereto by the host 12 by displaying the message on the multiline display 34 and receiving consumer entered data in response thereto. The host 12 can respond by such a further display message to the terminal 14, or it can communicate a message that the transaction step is ended.

In accordance with the invention the communication of multiline display messages from the host 12 to the terminal 14 is greatly facilitated by a segmentation technique in which commonly occurring segments of messages are communicated by the host 12 for storage in the terminal 14 prior to execution of transactions. The segments are inserted in the appropriate places within predetermined display messages previously stored in the terminal 14 or custom display messages communicated by the host 12 during an interactive transaction upon display of the message at the display 34. The display messages can incorporate a complete segment stored at the terminal 14 simply by identifying the presence of a segment and the number of the desired segment at the appropriate place within the display message where the segment is to be inserted. The stored segments can themselves refer to and incorporate therein consumer entered data which has been entered and stored in a separate location within the terminal 14.

Figure 2:
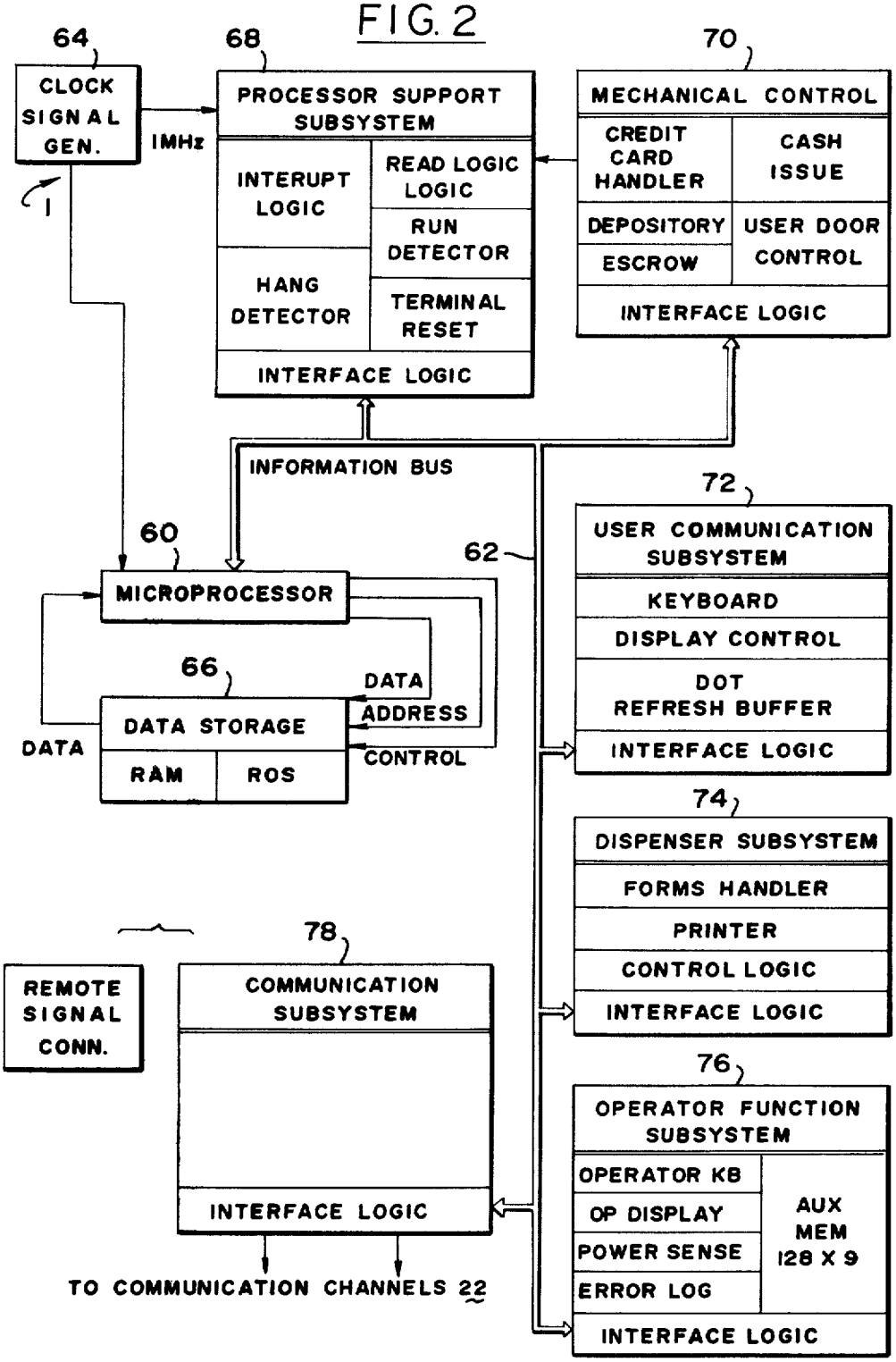
FIG. 2 is a block diagram of the terminal of FIG. 1B.

Thus, the transaction terminal 14 of the invention is an improvement with respect to transaction terminals of prior systems such as that of previously referred to U.S. Pat. No. 3,956,615 of Anderson et al. However, the basic arrangement of the terminal 14 is similar to that of the Anderson et al patent, FIG. 2 of which has been repeated herein for ease of reference as FIG. 2 of the present application. Reference is made to the Anderson et al U.S. Pat. No. 3,956,615 for a detailed description of FIG. 2 herein. Terminal 14 is generally modular in nature and includes a programmable microprocessor 60 coupled to a plurality of terminal subsystems by an information bus 62. Microprocessor 60 is driven by a clock signal from a clock generator 64 and is operationally connected to a dtat storage module 66 providing both electrically alterable random access memory (RAM) and read only storage (ROS). The read only storage portion of data storage 66 stores the various operating programs for the microprocessor 60. The random access memory portion of data storage module 66 provides a scratchpad for program execution, the storage of keys and the various table of information described hereafter. Reference is made to the Anderson et al patent for a description of the operational characteristics of a processor support system 68, a mechanical control subsystem 70, a user communication subsystem 72, a dispenser subsystem 74, an operator function subsystem 76 and a communication subsystem 78.

TERMINAL ORGANIZATION AND KEYBOARD CUSTOMIZATION

Figures 3, 4:
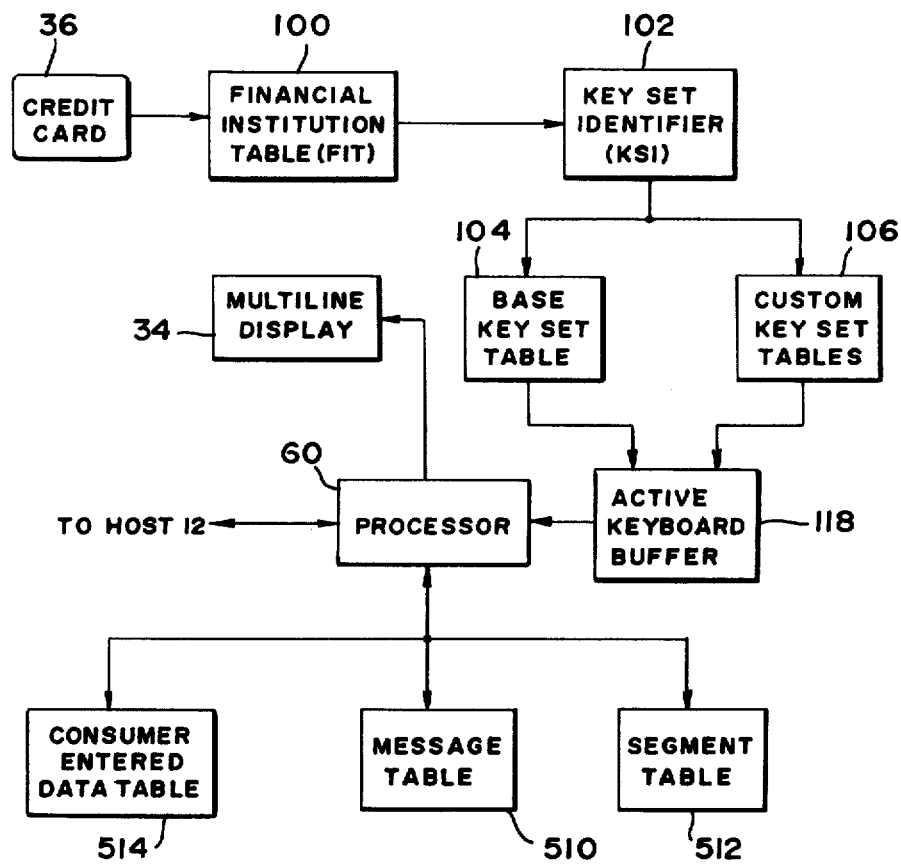
FIG. 3 is a detailed block diagram of a portion of the terminal of FIG. 1B.
FIG. 4 is a representation of the various keys of a keyboard forming a part of the terminal of FIG. 1B.

FIG. 3 depicts some of the details of the user transaction terminal 14 in accordance with the invention. The terminal 14 includes a financial institution table (FIT) 100 coupled to receive information from the magnetically encoded credit card 36. After the credit card 36 is entered in the terminal 14, the financial institution table 100 is searched for an entry to be associated with the card holder. Each entry in the financial institution table 100 contains a key set identifier (KSI) 102 identifying a key set to be used with the financial institution table entry. When a proper entry is found for the credit card 36 in the financial institution table 100, the corresponding key set identifier field 102 is used to select either a base key set table 104 or any one of a plurality of different custom key set tables 106.

A key set is a set of key definitions which describe the state of a key or how the key is to be used. As shown in FIG. 4 the keys of the keyboard 32 include eight Function keys 108, four From Account keys 110, four To Account keys 112, twelve Numeric keys 114 and four Control keys 116. The Function keys 108 are used to initiate a transaction and indicate the type of transaction desired. During execution of a transaction a From Account key 110 can be used to transfer funds from or make inquiry about a particular account. In addition thereto or in lieu thereof a To Account key 112 can be used to transfer something to an account. The Numeric keys 114 are used by the consumer to enter numerical information such as the number corresponding to an option chosen from a multiline display by the consumer and financial information such as the amount in dollars and cents to be deposited in an account or withdrawn from an account. The control keys 116 perform miscellaneous functions such as cancelling a transaction, changing a display page or verifying a data entry. The states of each of the Function keys 108, the From Account keys 110 and the To Account keys 112 are defined by the base key set table 104 or one of the custom key set tables 106.

In the present example the function keys 108 include WITHDRAW CASH, SPECIAL, ACCOUNT BALANCE, TRANSFER, DEPOSIT, PAYMENT ENCLOSED, BILL PAYMENT and CASH CHECK. The WITHDRAW CASH key is used when it is desired to withdraw cash from an account. The SPECIAL key is used when none of the other function keys are capable of providing the function desired by the consumer. Upon entry of a special account number by the consumer a number of functions are presented for selection by the consumer. These functions are defined by data stored in the terminal 14 during initialization and which may be peculiar and therefore customized to a particular institution. The ACCOUNT BALANCE key is used to determine the balance of a particular account. The TRANSFER key is used when it is desired to transfer funds from one account to another such as from a savings account to a checking account. The DEPOSIT key is used when it is desired to deposit cash, checks or the like in an account. The PAYMENT ENCLOSED key is used in connection with payment of a bill where the bill and cash or check in payment thereof are to be physically inserted into the terminal. Conversely, the BILL PAYMENT key made possible by the present invention is used when a bill is to be paid by electronic transfer of funds from the consumer's account to an account of the bill issuer. The CASH CHECK key is used when a combination of deposit and cash issue is desired such as where a check is deposited and a portion thereof is issued to the consumer as cash.

The From Account keys 110 include FROM CHECKING, FROM SAVINGS, FROM CREDIT CARD and FROM OTHER ACCOUNT keys. The FROM CHECKING key is used to inquire as to the status of a checking account or when transferring funds out of a checking account. The FROM SAVINGS key is used to determine the status of or to transfer funds out of a savings account. The FROM CREDIT CARD key is used to determine the status of or to transfer funds out of a credit card account. The FROM OTHER ACCOUNT key results in the terminal requesting entry of an account number which the consumer does to identify a special account.

The To Account keys 112 include TO CHECKING, TO SAVINGS, TO CREDIT CARD and TO OTHER ACCOUNT keys. The TO CHECKING key is used for depositing or transferring funds into a checking account. The TO SAVINGS key is used for depositing or transferring funds into a savings account. The TO CREDIT CARD key is used for depositing or transferring funds into a credit card account. The TO OTHER ACCOUNT key is used to transfer or deposit funds in a special account the number of which must be entered by the consumer in response to a display requesting the same.

The twelve numeric keys 114 include ten keys representing the digits 0–9, a key providing a decimal point and a CORRECTION key. The CORRECTION key is used when the consumer realizes that an item of entered data is incorrect and the consumer wishes to reenter such item.

The control keys 116 include CANCEL, CHANGE, and OK keys. The CANCEL key may be used to cancel an entire transaction before the transaction is completed. The CHANGE key is used by the consumer to advance the display from the page being displayed thereon to the following page. The OK key is used to verify data previously entered by the consumer and subsequently displayed together with a request for verification of the accuracy thereof. The OK key can also be used to terminate data entry such as where entry of fifteen digits is possible but the data entered by the consumer contains only ten digits.

The base key set table 104 provides a base set of definitions for each of the transaction keys 108, 110 and 112. When the credit card 36 locates an entry in the financial institution table 100 having a key set identifier 102 which identifies the base key set table 104, the various key state definitions of the base key set table 104 are presented via an active key buffer 118 to the programmable microprocessor 60. The processor 60 responds to actuation of a Function key 108, a From Account key 110 or a To Account key 112 by noting the state of that particular key from the active key buffer 118. The base key set table 104 includes customization data 119 (shown in FIG. 6) which is stored during initialization and which defines each of the sixteen keys as being active or inactive. Each custom key set table 106 can contain its own set of active/inactive key definitions which is logically combined with the customization data of the base key set table 104 and the results stored in the active keyboard buffer 118 when the custom key set table is selected by a key set identifier. The results of such combination are then used to determine the active or inactive status of each key finally defined in the active keyboard buffer 118 by logically combining the selected custom key set table with the base key set table 104.

The credit card 36 may be encoded so as to pick a key set identifier 102 from the financial institution table 100 which will select one of the custom key set tables 106 in lieu of the base key set table 104. Each of the custom key set tables 106 contains one or more key state definitions which differ from those contained in the base key set table 104 for the same keys. When one of the custom key set tables 106 is selected by a key set identifier 102, the definitions of the selected custom key set table 106 are logically combined with the key definitions from the base key set table 104 and the results stored in the active keyboard buffer 118. Where given key has a definition in both the base key set table 104 and the selected custom key set table 106, the buffer 118 presents the definition from the custom key set table 106 to the processor 60 to the exclusion of the definition from the base key set table 104. Where the selected custom key set table 106 has no definition for a particular key, the definition for that key from the base key set table 104 is used. This combined custom/base key specification applies only during the current transaction or chain of transactions performed by a given consumer. Therefore each new consumer and presentation of a new credit card 36 provides a new opportunity to define a key set table.

The ability to select one of a plurality of different key sets in response to each credit card entry provides a variety of different keyboard customization possibilities. The keyboard customization option allows member institutions of an interchange pool using the same terminal or terminal communication loop to specify customer keyboard configurations. This allows institutions to customize processing options within their own card base if there are multiple card classes which are to be treated differently as far as such things as transaction types allowed and accounts to be accessed are concerned. Thus, within a given financial institution sharing a particular terminal, that institution can issue one set of credit cards to a first class of customers authorized to perform a first set of transactions and a second set of credit cards to a second class of customers authorized to perform a different set of transactions but using the same keyboard configuration shown in FIG. 4. Moreover, each institution sharing a given terminal can specify processing options differently from the base processing options provided by the base key set table 104 or from the custom processing options of other sharing institutions. A still further advantage resides in the fact that institutions can share processing options for common card classes which differ from the processing options specified by the base key set table 104. For example, three institutions may want to treat their credit card customers in the same way using the same processing option which differ from the base key set table 104. This alternate set of processing options need only be specified once during initialization of the various tables within the terminal 14 and thereafter is accessible to all three institutions.

Figure 5:
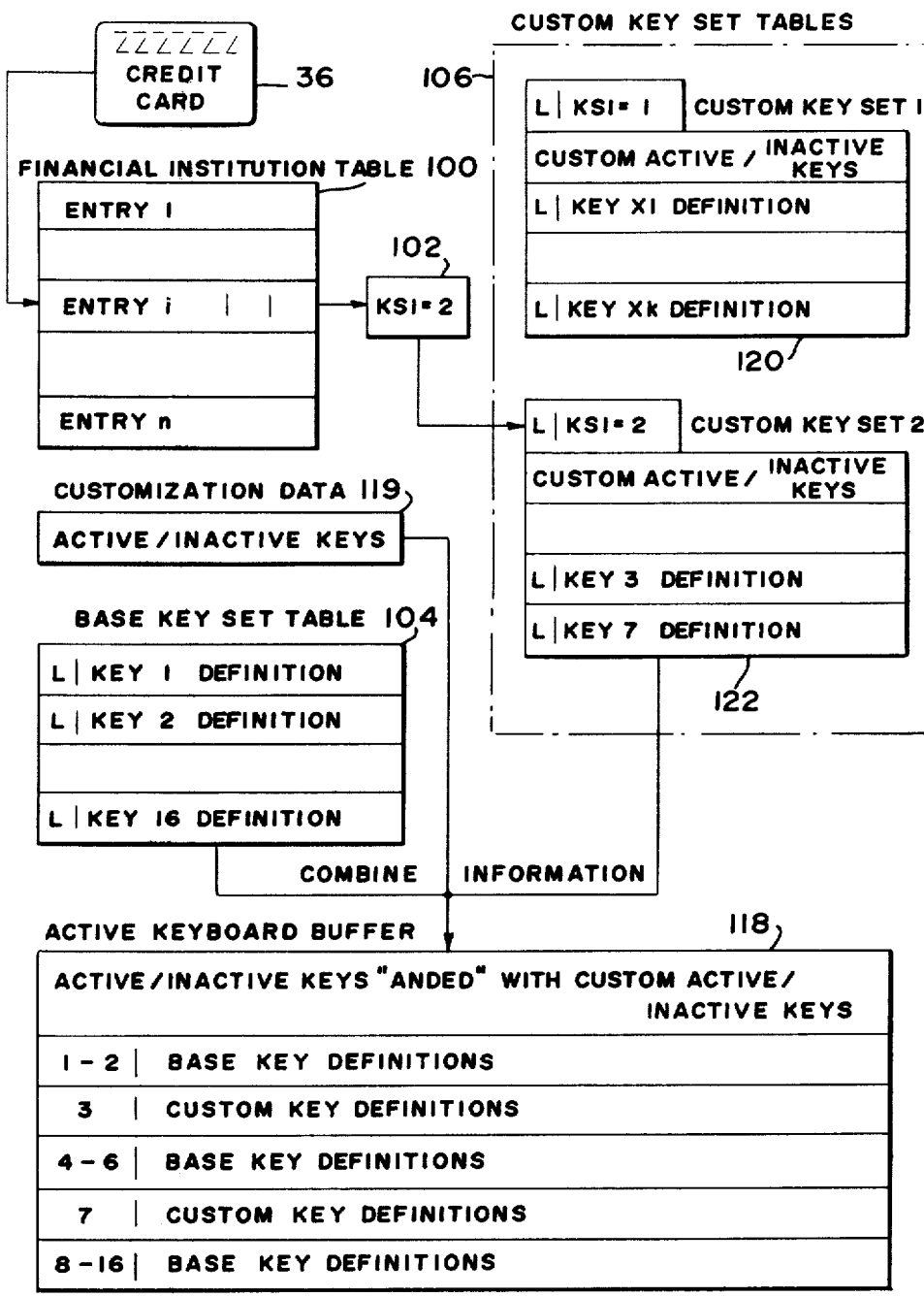
FIG. 5 is a detailed block diagram of a portion of FIG. 3.

FIG. 5 provides a detailed example of the organization of the financial institution table 100, the key set tables 104 and 106 and the active keyboard buffer 118. Insertion of the credit card 36 results in a search for a corresponding entry in the financial institution table 100. In the present example there are "n" different entries in the table 100, each of which corresponds to a different class of the credit cards 36. Each entry has a corresponding key set identifier field 102. In the case of Entry 1, the included KSI=0 specifying use of the base key set table 104. The base key set table 104 contains a definition for each of the sixteen keys comprised of the Function keys 108, the From Account keys 110 and the To Account keys 112. The definitions in the base key set table 104 are then presented by the active keyboard buffer 118 for use by the processor 60. The base key set table 104 also includes the customization data 119 shown as a separate item in FIG. 5 and which defines each of the sixteen keys as either active or inactive.

In the example of FIG. 5 the custom key set tables 106 include a first custom key set table 120 identified by KSI=1 and a second custom key set 122 identified by KSI=2. In addition to active/inactive definitions for certain keys, the first custom key set 120 contains definitions for certain of the sixteen keys here designated as X1-XK. The second custom key set 122 may identify certain keys as active or inactive and also contains definitions for key 3 and key 7. In the present example, the credit card 36 selects "Entry i" in the financial institution table 100, and the included field KSI=2 results in selection of the second custom key set 122. The second custom key set table 122 is logically "ORED" with the base key set table 124 to provide the active keyboard definitions shown at the bottom of FIG. 5 and entered in the active keyboard buffer 118. The definitions of keys 3 and 7 from the second custom key set 122 are substituted for the definitions for keys 3 and 7 in the base key set table 104. As a result, definitions from the base key set table 104 are used for keys 1, 2, 4-6 and 8-16, while definitions from the second custom key set 122 are used for keys 3 and 7. At the same time the customization data 119 is logically "ANDED" with the active/inactive definitions in custom key set 122 and the results stored in the active keyboard buffer 118 to be used to control the sixteen key definitions in the buffer 118. Thus, if either or both of the active/inactive definitions for a given key designates an inactive status, the key is shown by the buffer 118 to be inactive. Otherwise the key is shown as active.

FIGS. 6A-6E show the format of the various different portions of an entry in the financial institution table 100. The format portion shown in FIG. 6A is common to all entries in the table. The credit card 36 normally has two different magnetically encoded strips or tracks thereon identified as T2 and T3. In some cases only T2 or T3 is used while in other cases both are used. Where only T2 is used, the common portion of FIG. 6A is followed by the format shown in FIG. 6B. Where only T3 is used, the common portion of FIG. 6A is followed by the format of FIG. 6C. Where both T2 and T3 are used, the common portion of FIG. 6A is followed by the format of FIG. 6D. The custom keyboard fields shown in FIG. 6E are utilized in accordance with the invention and comprise the ending portion of each entry in the financial institution table 100.

Referring to FIG. 6A the various fields shown therein are identical to those used in prior systems of this type such as the one described in previously referred to co-pending application Ser. No. 882,529, of Anderson et al, with the exception of the third or FORMAT field 140. The FORMAT field 140 indicates whether keyboard customization fields, KSI and IMI are present. A KSI field 142 is shown in FIG. 6E and corresponds to the key set identifier 102 of FIG. 3. The KSI field 142 comprises a byte defining a particular number. In the present example KSI=0 identifies the base key set table 104, KSI=1 identifies the first custom key set 120 and KSI=2 identifies the second custom key set 122. A second or IMI field 144 in FIG. 6E is one byte long and comprises the institution message identifier. This field is used in a multilanguage option described hereafter in connection with FIGS. 19 and 20. As described hereafter standard display messages are normally stored in a base page or message table in the terminal. The display messages in accordance with the invention can include message segments normally stored in a base segment table in the terminal. In the multilanguage option, one or more additional message and segment tables are added to the terminal in conjunction with a language table which selects different combinations of the tables in composing messages for display at the terminal. The IMI field 144 is used to search the language table in order to find the message and segment tables associated with this entry in the financial institution table 100.

The remaining fields of the common portion of FIG. 6A which deal mainly with PIN verification are similar to those shown in and described in connection with FIG. 6 of Anderson, et al, U.S. Pat. No. 4,186,871.

Where only the magnetic track T2 on the credit card is used, the common portion of the entry shown in FIG. 6A is followed by the portion shown in FIG. 6B. The portion of FIG. 6B is conventional except for the addition of a T2 LANGUAGE field 146 at the beginning thereof. The T2 LANGUAGE field 146 indicates whether there is a language field on track T2, the location of such field and the identity of such field. The language field is used in conjunction with the IMI field 144 during the multilanguage option. The remainder of the portion of FIG. 6B contains conventional fields defining the check location for an offset personal identification number, check data displacement and the length of PIN check data.

The portion of FIG. 6C follows the common portion of FIG. 6A in entries where only the magnetic track T3 on the credit card is used. The various fields of FIG. 6C are conventional except for the first field thereof which comprises a T3 LANGUAGE field 148. The T3 LANGUAGE field 148 is like the T2 LANGUAGE field 146 of FIG. 6B except that it refers to track T3 instead of track T2. The remaining fields of FIGS. 6C are identical to those of FIG. 6B, but in addition include fields pertaining to T3 PIN retry, PIN retry displacement and data map.

The portion of FIG. 6D follows that of FIG. 6A in the case of entries where both magnetic tracks T2 and T3 are used. The fields of FIG. 6D are identical to those of FIG. 6C with the exception of the first field which comprises a T2/3 LANGUAGE field 150. The field 150 of FIG. 6D is identical to the fields 146 and 148 of FIGS. 6B and 6C except that in addition it contains a bit identifying which of the two tracks the language field is to be found in.

As previously noted the portion of FIG. 6B, 6C or 6D is followed by the portion of FIG. 6E containing a field 142 identifying the key set identifier and a field 144 containing an institution message identifier where the multilanguage option is to be used.

FIG. 7 shows the format for a key set table such as the base key set table 104 or one of the custom key set tables 106 of FIGS. 3 and 5. A first or L field 170 which two bytes in length defines the length of the key set. The second one byte field comprises a KSI field 172. The KSI field 172 associates the key set with an entry in the financial institution table 100. The KSI field 172 denotes "0", "1" or "2" in the example of FIG. 5. An ACTIVE FUNCTION KEYS field 174 indicates which of the Function keys 108 shown in FIG. 4 are active for this particular key set. Each of the eight bits of this byte corresponds to a different one of the eight Function keys. A bit value of "0" indicates that the key is inactive and a value of "1" indicates that the key is active. An ACTIVE FA KEYS field 176 and an ACTIVE TA KEYS field 178 designate respectively the inactive or active status of the From Account keys 110 and the To Account keys 112. The first four bits of each byte define the four different keys of each key group 110 and 112.

A succession of key definitions follows the ACTIVE TA KEYS field 178. Each key definition is comprised of a one byte LK field 180 which defines the length of the key definition and a key definition 182 of variable length. The key set table shown in FIG. 7 has N different key definitions. As previously noted the base key set table 104 contains sixteen definitions covering each of the Function keys 108, the From Account keys 110 and the To Account keys 112. Each of the custom key set tables 106 can have from one to sixteen different definitions depending on which keys are to be defined differently from the base key set table.

The format for each key definition shown in FIG. 7 is shown in FIG. 8. In the key definition format of FIG. 8 the LK field 180 is followed by the key definition 182 which begins with a KEY ID field 184. The KEY ID field 184 provides the key code identifying the key to which the definition pertains. A following ALT KEY CODE field 186 provides an alternate key code for the key. The alternate key code comprises a value which is returned as the "key code" as part of interactive start and transaction request messages to the host data processing system 12 to distinguish to the applications program 26 at the host the type of data being received at the terminal 14 such as data entry key data, interactive key data, account data and so on. A following KEY FLAG field 188 describes the state of the key. Bit 0 of this byte denotes the standard key state in which no data entry is allowed after the key has been hit and no messages are displayed. Bit 1 of the byte denotes the data entry key state. This state allows specification of the minimum and maximum lengths of the consumer data entry as well as a list of pages to be displayed after a key has been entered. A verification message identifier may also be specified. Bit 2 of the key flag field 188 is used to identify an interactive key state. In this state the terminal 14 queries the host 12 for pages to display to the consumer after the key has been pressed. Consumer data entry parameters and verification parameters are also obtained from the host 12.

If bit 0 or 2 of the KEY FLAG field 188 is selected, the key definition format terminates with the key flag field 188. If bit 1 is selected so as to define the key as data entry, then a number of fields follow the KEY FLAG field 188. These following fields include a MESSAGE FLAG field 190, a MIN CDEL field 192, a MAX CDEL field 194, an LP field 196 and a plurality of display pages.

Bit 0 indicates whether display data is present or not. Bit 8 of the bytes comprising the MESSAGE FLAG field 190 is always "1" and indicates that all pages of the display page set at the end of the key definition format are present. When the last page of the page set is being displayed and the CHANGE key is actuated, the first page of the page set is displayed next. Bit 9 indicates whether a verification step is to occur after consumer data entry. Bit 10 indicates whether the decimal point is used as a data delimiter (i.e. not a dollar and cents indicator). Bit 11 is a format standardization bit which insures that there are two digits following a decimal point in an amount by adding zeros if necessary. Bit 12 indicates whether consumer data entry is expected. Bit 13 indicates whether or not the substitution data consists of transaction definition bytes. Bit 14 indicates whether or not the transaction is to be cancelled.

The following MIN CDEL field 192 indicates the minimum length that consumer entered data can have. The following MAX CDEL field 194 indicates the maximum length that the consumer entered data can have. If MIN=MAX=0, the only data entry allowed will be the OK key or another Control key. The LP field 196 indicates the total length in bytes of page definition data.

Each of the display pages at the end of the key definition format of FIG. 8 is comprised of a PAGE FLAG field 198 and a PAGE ID field 200. The PAGE FLAG field 198 describes the display page characteristics. When bit 0="1", this indicates that a resident page identifier follows. When bit 1="1", this indicates that a verification page definition follows. The PAGE ID field 200 contains the display message identification number which ranges from 1 to 255. As previously noted a plurality of different display messages originating in the host 12 may be stored in the terminal 14 for use during execution of transactions. The PAGE ID field 200 identifies one of the pages stored in the message or page table of the terminal as one of the sequence of messages to be displayed to the consumer during execution of the transaction requested by actuation of the data entry key.

DATA ENTRY KEY OPERATION

The data entry key function provides a capability similar to interactive operation by which a terminal can display a limited set of display messages to the consumer while not requiring an interactive message exchange between the terminal 14 and the host 12. The display messages used in data entry key operation are not customized to the individual consumer but instead represent generalized display messages to be used by all users of the terminal. The data entry key function is useful for institutions that want to minimize terminal-host message traffic and for use with application programs not prepared to handle interactive communication messages. As such, data entry key operation represents an intermediate function between standard key operation and full interactive operation.

As described in connection with FIGS. 7 and 8, selected ones of the keyboard keys can be defined as data entry keys by an institution upon initialization when data is communicated to the terminal to define the values in the various tables. The various key set tables as shown in FIG. 7 can be provided with display pages as part of the key definition upon initialization as shown in FIG. 8. Each key definition can define the minimum and maximum consumer data entry length, whether or not a verification step is required, a special verification display message to be used if a verification step is required, and a list of display message pages to be displayed when the associated key is pressed.

When a consumer presses a key and the key definition associated therewith located via the financial institution table 100 defines the key as data entry, the first display page is displayed on the multiline display 34 at the terminal. The consumer is expected to respond to the display message in one of the following ways:

1. Press the CANCEL key to terminate the transaction.
2. Press the CHANGE key to view another page of the data entry key display message set.
3. Press a key in the currently active or previously active Function, From Account or To Account key groups to cause a branch back condition (described hereafter).
4. Enter data using the Numeric keys 114.
5. If data has been entered, press the CORRECTION key to clear the data previously entered or press the OK key to terminate the data entry.

Once data entry is complete, if a verification step has been specified for the key, a verification message is displayed. The consumer is expected to respond in one of the following ways:

1. Press the CANCEL key to terminate the transaction.
2. Press a key in the currently active or previously active Function, From Account or To Account key groups to cause a branch back condition.
3. Press the CORRECTION key to clear the data previously entered and return to the previously displayed page which will allow reentry of the keyed data.
4. Press the OK key to complete the transaction step.

When the transaction step is complete, processing continues at the next transaction step. The consumer entered data is sent to the host 12 as part of the transaction request message associated with the transaction and described in detail hereafter.

A better understanding of the operation of the transaction execution system described thus far including the features of keyboard customization and data entry key as well as interactive key described hereafter may be had by considering in detail the format of a transaction request message generated at the terminal toward the end of a transaction. The format of such a message is shown in FIG. 9. The transaction request message transfers the consumer entered data from the terminal to the host. In the case of both a data entry key and an interactive key the transaction request message is sent when the display messages and responses of the various transaction steps are completed.

The first or L field 250 of the transaction request message defines the message length.

A following N field 252 contains the transaction sequence number. When the host 12 is first notified that a transaction is in progress, the transaction sequence number is incremented and placed in the field 252 of the next transaction request message. All succeeding terminal-to-host messages associated with this transaction contain the same transaction sequence number.

The next or C field 254 defines the message class. All transaction request messages have the class X'01'. The next or SC field 256 defines the message subclass. A VAR field 258 defines a varying number which prevents an enciphered personal identification number from appearing on the communication lines as a constant. A following PIN field 260 contains the enciphered personal identification number of the consumer.

A FAS field 262 is present only when one of the four From Account keys 110 has been pressed. The first byte of the field indicates which of the four From Account keys was pressed. If an account number was entered, 1 to 20 bytes follow to identify the account. If the alternate key code function is specified in the key set table, the first byte contains the alternate key code value provided in the key definition for the From Account key depressed. A following FS or field separator field 264 defines the limits of variable length fields.

A TAS field 266 is present only for transactions involving actuation of one of the To Account keys 112. The first byte of the field indicates which of the four To Account keys was pressed. If an account number was entered, 1 to 20 bytes that follow the first byte of the field identify the account number. If the alternate key code function is specified in the key set table, the first byte contains the alternate key code value provided in the key definition for the To Account key depressed.

The TAS field 266 is followed by an FS or field separator field 268.

An SPT field 270 is present only if the consumer selected a special transaction key. It contains the special transaction number. A following AMT field 272 is present only for transactions that include an amount. The following MX field 274 is present only for transactions which include dual cash dispensing cartridges at the keyboard. It contains the number of larger denomination bills which must be replaced by smaller denomination bills to produce the desired denominational mix. A field separator field 276 follows.

Following the field separator field 276 is a T2 DATA field 278. This field contains 0 through 19 bytes of data read from track T2 of the consumer's credit card. The data is packed, two digits per byte, and the end-of-card, start-of-card and longitudinal redundancy check digits are not included. This field is present only if T2 data is good as determined by the MFLAG field described hereafter and if the issuing institution entry in the financial institution table 100 specifies that T2 data be sent for this card type. Following a field separator 280 an MFLAG field 282 containing card and personal identification number flags occurs. This is a one byte field containing flags that describe card track status and personal identification number entry requirements and status. Bit 0 of this field is set to "1" if T2 was read successfully from the card by the terminal. Bit 1 of this field is set to "1" if T3 data was read from the card successfully by the terminal. Bit 2 of the field is set to "1" when the consumer fails to enter a valid personal identification number within the number of entry attempts allowed. Bit 3 of this field is set to "1" when the try count obtained from T3 is 0 and the consumer failed to correctly enter his personal identification number on the single attempt allowed. Bit 4 of this field denotes card reader switch irregularity. The terminal monitors the card reader, and if any switch irregularities are sensed the transaction is aborted. Bit 5 of the field is set to "1" whenever the terminal does not perform personal identification number validation. It is then up to the applications program in the host to validate the consumer personal identification number before authorizing a transaction. Bit 6 of this field is set to "1" if data was detected on both T2 and T3. This bit along with bits 0 and 1 defines the card readability, which information is used by the terminal to access the proper financial institution table entry.

In a following PIN TRY field 284 an indication is provided of the number of personal identification number entry attempts. This field contains the number of PIN entries attempted, including the valid PIN entry, or it contains the number of entries made prior to a time-out or consumer cancel, or PIN entry limit reached. A following T3 DATA MAP field 286 is present if the T3 data was determined to be good in the MFLAG field 282 and if the issuing institution's financial institution table specifies that T3 data be sent for this card type. This field is a copy of the T3 MAP or T23 MAP field from the financial institution table entry. The field further specifies whether the entire T3 content is contained in a following T3 DATA field 288, or otherwise which fields from the card are contained in the T3 DATA field 288. In the DATA data field 288 which is present only if the T3 DATA MAP field 286 is present selected data from T3 is contained. The data characters are packed, two per byte. The card control characters for start-of-card, end-of-card and longitudinal redundancy check are not included as the terminal has already performed card data checks prior to accepting the consumer's card.

Following a field separator 290 an LID-IMI field 292 occurs. The field 292 contains the two byte language table entry identifier field used for this cardholder for the multilanguage option. Bits 0-7 of this field define the LID which is the language ID value obtained either from the financial institution table entry being used or from the credit card or from a consumer choice. Bits 8-15 of this field define the IMI or institution message identifier obtained from the financial institution table entry being used.

Following a field separator 294 a TRS or transaction selection field 296 indicates which of the 8 Function keys 108 was pressed and, if a Function key is defined as data entry, the indication is followed by up to 20 digits. If the alternate key code function is specified in the key set table, the first byte of this field contains the alternate key code value provided in the key definition for the Function key depressed. The TRS field 296 is followed by a field separator 298 which ends the transaction request message.

As previously noted in connection with FIG. 1B the applications program 26 within the host data processing system 12 provides display messages during an interactive transaction to the terminal 14. Data entry keys use standard, predetermined messages stored in the terminal 14 during initialization.

Messages defining the displays to be used in the execution of a transaction are organized by the applications program 26 into selection groups. A selection group may be defined as a set of hierarchically-organized data which describes the total range of options available to a consumer at a transaction step, for a particular key. For interactive keys, selection group data is requested from the host 12 when the consumer begins an interactive sequence for that transaction step by hitting an interactive key. The applications program 26 tailors the selection group data according to the transaction step during which the interaction is occurring and optionally uses information about the consumer who has started the transaction to further customize the data transmitted.

Selection group data is divided into smaller units called selection sets. A selection group for interactive keys typically consists of many selection sets. For data entry keys, a selection group consists of just one selection set. Since the display information resides at the terminal 14 in the case of an data entry key and is not customized to the consumer, the information must be more general and categorical in nature. Since standard keys require no additional data entry once the key has been entered, there is no need to provide selection groups for these keys.

Figure 10:
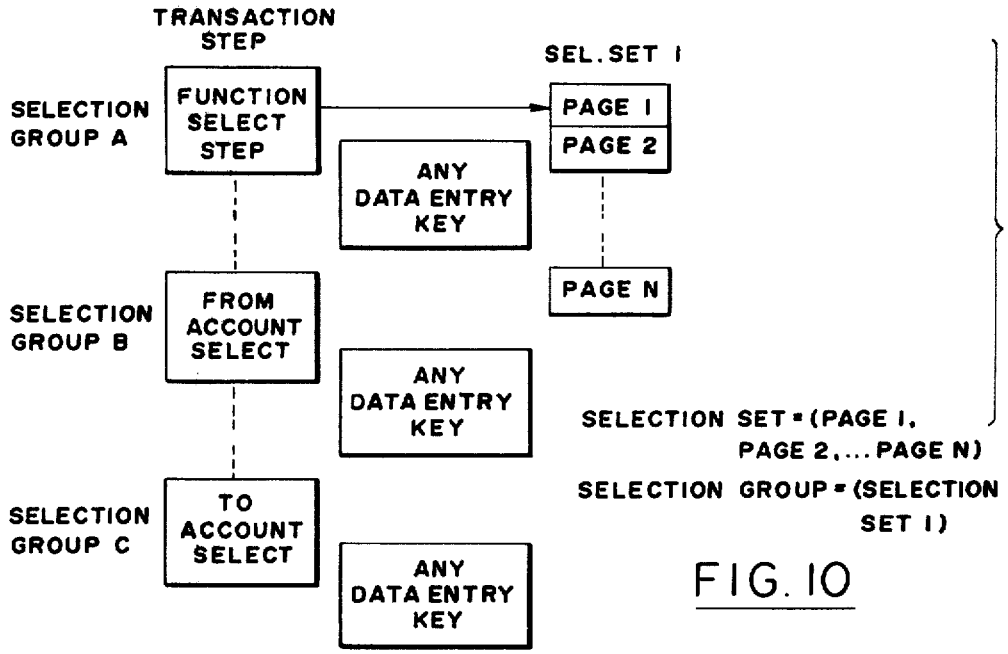
FIG. 10 is an operational block diagram representation of the data organization in an expanded key transaction.

FIG. 10 depicts the data organization for data entry keys. A different selection group is associated with each of the sixteen different transaction keys. Thus, a selection group A is associated with a Function key 108 defined as having a data entry state. A selection group B is associated with a From Account key 110 defined as having the data entry state. A selection group C is associated with a To Account key 112 assigned the data entry state. As noted above, in the case of data entry keys, each selection group has just one selection set. In the case of selection group A, this selection group consists of selection set 1 which includes pages 1 through N. A selection set can consist of a single page of display or as many pages as are necessary to present a complete message. Selection groups B and C each have a single selection set which is not shown in FIG. 10 for reasons of brevity.

When a data entry key is actuated by a consumer, the terminal 14 displays a page of information which is taken from selection set 1 if a Function key has been actuated. The consumer may respond by actuating the CHANGE key which indicates that another page of information from selection set 1 should be displayed, or by entering numeric data which indicates a selection of an item from the list displayed. Thus, many selection sets will consist of more than one page, and depending on the function the first page may present the consumer with a plurality of options with the options being continued on a second and perhaps subsequent pages because of the space required to list the options. If a verification step is indicated, the terminal 14 responds to consumer entry of numeric data by displaying a verification page to the consumer. If the consumer indicates that the information entered is correct, the data collected at the terminal 14 is saved and the terminal proceeds to the next transaction step. The data collected in this manner is transmitted to the host 12 with other transaction information as part of the transaction request message.

INTERACTIVE KEY OPERATION INCLUDING CUSTOMIZED DISPLAY MESSAGES FROM HOST

Figure 11:
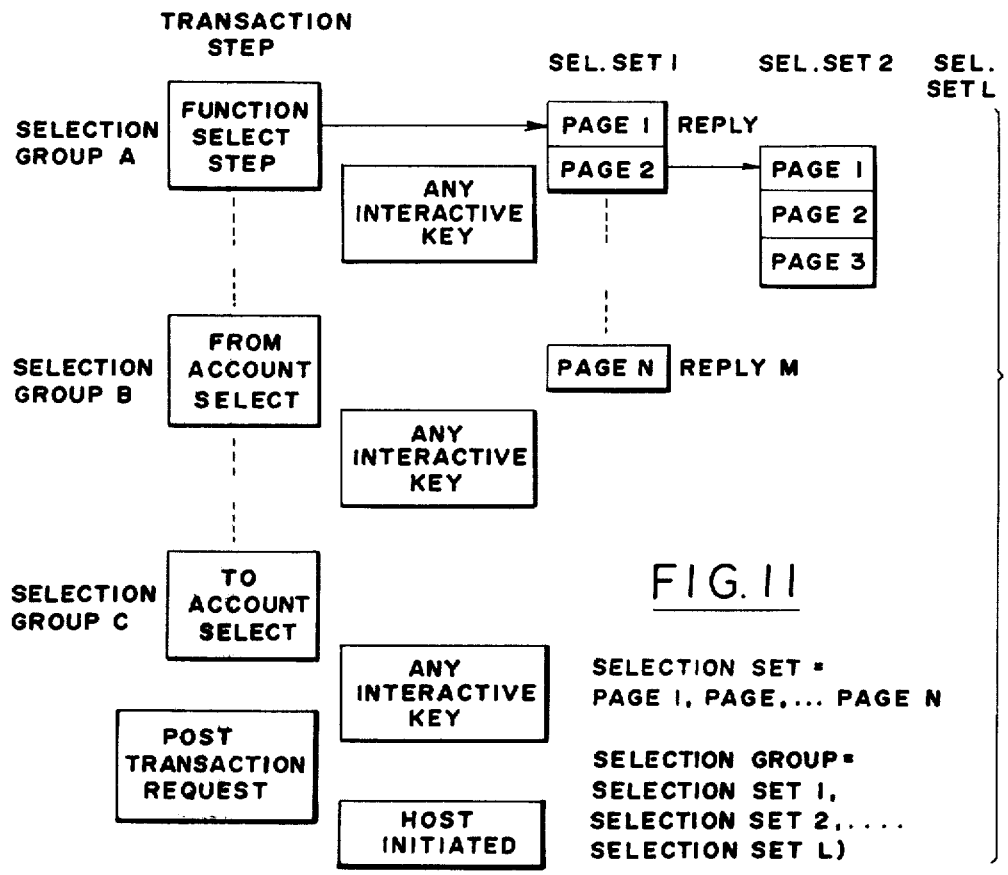
FIG. 11 is an operational block diagram representation of the data organization in an interactive key transaction.

FIG. 11 depicts the data organization for interactive keys. As in the case of FIG. 10 there is a different selection group associated with each of the sixteen different transaction keys. However, each selection group is capable of having and typically has more than one selection set. Thus, selection group A is shown as including selection set 1 and selection set 2. Selection set 1 consists of N different pages and selection set 2 consists of three pages. Execution of the transaction step requested by actuation of the Function select key begins with the assembly of selection set 1 by the applications program 26 within the host 12 and the communication of the selection set to the terminal 14. The terminal then displays page 1 of selection set 1 requesting a reply by the consumer. If the consumer sends a particular reply designated REPLY 1 in FIG. 11, the terminal sends the reply to the host and the host may send selection set 2. The terminal then displays page 1 of selection set 2. Depending on the consumer reply, the host may send further selection sets of the selection Group A until the transaction step is completed.

When an interactive key is actuated, direct communication between the host 12 and the consumer takes place. The terminal 14 essentially acts as an intermediary for an informational exchange between the host and the consumer. The content of the information presented to the consumer and the consumer's response are unknown to the terminal 14 in most instances. When an interactive key is actuated, the terminal 14 initiates a transmission requesting a selection set from the host 12. Upon receipt of the selection set (selection set 1 in FIG. 11) the terminal 14 displays the first page of the selection set. If there is more than one page in the set, the consumer can view the next page of the set by depressing the CHANGE key. Depending on the number of pages in a selection set and the number of pages included in the first host transmission, a paging request may cause the terminal-host interchange to get additional pages of the selection set. If the consumer makes a paging request on the last page of a selection set, and the entire selection set is contained in one transmission from the host, the terminal will return to and display the first page of the selection set. Otherwise the terminal will request additional pages from the host.

The applications program 26 within the host 12 defines the minimum and maximum number of characters to be entered by the consumer for each selection set. If the number of characters entered exceeds the maximum permitted by the particular terminal used, the terminal 14 ends the transaction after retries and sends an interactive status message to the applications program 26. The host 12 also specifies the location on the multiline display 34 at the terminal 14 where the consumer entered data is to be displayed as it is keyed. After determining the information to be entered, the consumer enters the data via the terminal keyboard. If a mistake is made while entering the data, the consumer may use the CORRECTION key to erase the previously entered data and the data then may be reentered.

If the host 12 has sent a validation list to the terminal, the terminal 14 performs validation by searching the list for a comparison with consumer entered data. If the consumer entered data is not on the validation list, an error is indicated and the consumer is asked via another display message to enter another number. If the consumer entered data is on the validation list and no substitution data was sent with the validation list, the consumer entered data is used as is.

The applications program 26 can specify that a verification message be displayed at the conclusion of data entry by the consumer. The verification display includes the consumer entered data and requests the consumer to signify whether the information is correct or incorrect, or to cancel the transaction. If correct, the consumer presses the OK key. If incorrect, the consumer presses the CORRECTION key which returns the consumer to the data entry phase and the terminal 14 displays the page of the selection set which was active before data entry was completed. The consumer uses the CANCEL key to terminate the transaction. The CANCEL key can be used at any time during the interactive process to terminate the transaction. Once verification is complete, the terminal 14 transmits the consumer response to the applications program 26. The applications program 26 uses the consumer's response to determine what to do next. It can either continue the selection group by sending another selection set or terminate the selection group by indicating that it is complete. If the selection group is complete, transaction processing continues within the terminal 14. If additional transaction steps are required, these are performed.

As previously noted a validation list can be sent by the host for comparison with the consumer data entry. If the validation list is accompanied by substitution data and the consumer data entry is found on the validation list, then following verification a substitution process occurs in which the substitution data is substituted for the consumer entered data prior to communication to the host 12. Validation and substitution are useful in certain transactions such as cash issue. In the case of cash issue the consumer is asked to enter a number from the display message corresponding to the denomination of bills to be withdrawn. If the number entered by the consumer is on a validation list, then substitution data can be used to replace the consumer entered number with the bill denomination, thereby avoiding a separate amount entry step.

Throughout the interactive process the applications program 26 within the host 12 is responsible for the number and sequence of interactions, the content and format of each interactive message and the acceptability of each consumer response. The application may be as simple as a single interaction or as complicated as processing a repetitive interactive sequence or a complex decision tree.

FIG. 12 depicts the different types of communication steps involved in an interactive transaction. Following a card entry step 350 consumer identification is accomplished by financial institution table processing in a step 352 followed by personal identification number processing in a step 354. As previously described in connection with FIGS. 3 and 5, FIT processing 352 is accomplished by searching the financial institution table 100 within the terminal 14 for an entry corresponding to the card entered. Upon location of the corresponding entry the proper key set table is selected and the proper encryption key is located for subsequent verification of the consumer's identity during PIN processing 354. In the event a corresponding entry in the financial institution table 100 within the terminal 14 cannot be found, the terminal 14 sends a VFIT transaction request to the host 12 for search of a virtual financial institution table at the host 12. If a corresponding entry is found within the virtual financial institution table at the host 12, the corresponding fields are sent to the terminal 14 as part of a VFIT transaction reply. Thereafter the terminal 14 communicates a virtual financial institution table status message to the host 12. The manner in which a virtual financial institution table within the hose is used is described in detail in previously referred to copending application Ser. No. 882,529, of Anderson et al.

The general interactive protocol is shown by the next four steps designated 356, 358, 360 and 362 in FIG. 12. During these steps the consumer in effect tells the host 12 what it would like to do. The Function selection step 356 represents actuation of one of the Function keys 108 of the keyboard of FIG. 4. This initiates a transaction and comprises the first step thereof. The From Account selection step 358 represents actuation of one of the From Account keys 110 of the keyboard of FIG. 4. This may occur, and if so comprises a second step in the transaction. The To Account selection step 360 represents actuation of one of the To Account keys 112 of the keyboard of FIG. 4, comprising a possible third step in the transaction. During a given transaction, up to all three of the steps 356, 358, and 360 may be required. Each individual step 356, 358 or 360 results in the terminal 14 preparing and communicating to the host 12 an interactive start message, to which the host 12 responds by communicating an interactive display message including a selection set to the terminal 14. The consumer's response is communicated as an interactive response message to the host 12. The host 12 may send an interactive display message with a further selection set in response to each interactive response from the terminal 12, or it may sense an interactive completion message to the terminal 14 to terminate the transaction step. In a further step of the transaction designated "amount selection" 362, the consumer enters an amount in connection with one or more of the steps 356, 358 and 360.

Upon completion of the amount selection step 362 the consumer has sent to the host 12 information describing the transaction he wishes to have executed. The following steps 364, 366 and 368 shown in FIG. 12 enable the host 12 to supervise the transaction request by first determining what is possible and thereafter carrying out the transaction. In the first such step 364 the terminal 14 sends a formal request to the host 12 in the form of a transaction request message. The transaction request message which was shown and described in detail in FIG. 9 contains any necessary information not previously communicated to the host 12. The host responds by communicating a transaction reply message to the terminal 14, which reply is processed by the terminal 14 in the step 366. The terminal 14 communicates information as to the status of the transaction to the host 12 in the form of a transaction status message in the final step 368.

The transaction request, reply and status messages shown in FIG. 12 are used in the case of each transaction regardless of whether one or more of the steps of the transaction request message was described in detail in connection with FIG. 9 is prepared and sent by the terminal 14 to the host 12 when the terminal 14 determines that the necessary information for the transaction has been gathered. This typically requires at least one and up to all four of the selection steps 356, 358, 360 and 362 shown in FIG. 12. Each of these selection steps involves a key which may be standard, data entry or interactive.

In the case of most transactions all of the data required by the host 12 to process the transaction is included in the transaction request messsage. In such instances it is only necessary for the host 12 to indicate in the transaction reply message to the terminal 14 that the transaction is approved by the host and is being processed. Occasionally, however, the applications program 26 within the host 12 determines that the data sent with the transaction request is insufficient. Such an occasion may arise, for example in a case where a consumer has more than one checking account. After using the FROM CHECKING key, a transaction request message is prepared indicating to the host that funds are to be transferred from a checking account of the consumer. The applications program 26 then determines that the particular consumer has more than one checking account, thereby requiring further information in the form of identification of the particular checking account from which the funds are to be transferred. In this example and in certain other situations where the host requires additional information, the host 12 may include a display message requesting consumer entry of the needed data as part of the transaction reply message to the terminal 14. Alternatively, the host 12 can initiate an entire interactive sequence with the terminal 14 by sending an interactive message to the terminal requesting an interactive response message in return. Where a display requesting additional consumer entered data is sent as part of the transaction reply message, the display message is accompanied by data enabling the terminal to test the consumer's response. For example, where the display message requires the consumer to select item 1, 2, 3, 4 or 5 of the display, such data would prevent the terminal from accepting a consumer response such as "10" or "20". When the terminal 14 determines that the consumer response to the display message is valid, such response is included as part of the transaction status message to the host 12 which terminates the transaction.

The various host-terminal intercommunications described in FIG. 12 can be better understood by considering the various steps of an interactive sequence which such messages form a part of. Such steps include the following:

1. A consumer, after entering his card and personal identification number, presses an interactive key at the terminal 14.
2. The terminal 14 recognizes the need for an interaction and generates an interactive start message to the host 12. The message includes the consumer key entry, personal identification number check data and card data.
3. The interactive start message is received by the message processor 24 within the host 12. The processor 24 relays the message to the applications program 26.
4. The applications program 26 determines whether or not this is a valid consumer, and if it is, whether there is access to the consumer's information files in the files 30. If this is not a valid consumer, then an interactive completion message is sent to the terminal 14 instead of an interactive display message. The completion message results in the transaction being terminated.
    a. If the consumer is determined to be valid but the applications program 26 does not have access to the consumer's files, then the program may record the key entered, interpreting it on the simplest level (i.e. savings represents only one savings account) and sending an interactive completion message to end the interaction but not the transaction.
    b. If the consumer is determined to be valid but the applications program 26 has access to the consumer's files, then the program prepares a series of custom displays 28 for the consumer listing all available options.
5. The message processor 24 prepares the custom displays for transmission to the terminal 14. If the custom displays cannot be sent in one interactive display message, a series of interactive display messages which include the custom displays is prepared. The host 12 then sends the first interactive display message to the terminal 14.
6. The terminal 14 displays the custom display to the consumer.
7. The consumer responds by either selecting an item on the display or entering a change display response.
8. If the terminal 14 runs out of custom displays, it sends an interactive response message to the host 12 requesting additional custom displays.
9. The message processor 24 in the host 12 sends the interactive display messages of step 5 above and the terminal 14 sends the interactive response messages requesting more custom displays as enumerated in step 8 above as long as the message processor 24 has displays to send and the consumer wishes to seen them before selecting an item displayed.
10. When the host 12 recognizes the terminating condition (i.e. a consumer selects an item or it determines the information sent is incomplete), the message processor 24 sends an interactive completion message to the terminal 14.
11. The terminal 14 moves on to the next transaction step when it receives the interactive completion message.

The interactive completion message may additionally contain a series of transaction definition fields which can alter the execution of subsequent transaction steps, such as eliminating the need for a From Account step if the step information was collected during a Function key interaction. This feature allows dynamic optimization of transaction flow.

An interactive start message is sent each time the terminal 14 wishes to initiate an interaction with the host 12. Interactions are allowed at three transaction steps: Function select, From Account select, and To Account select. In addition the host can initiate an interactive sequence by so specifying in the transaction reply. The terminal 14 sends an interactive start message when a key defined as interactive is entered. The major fields of an interactive start message are:

1. PIN fields, which include the consumer-entered PIN and the number of attempts the consumer made to enter his PIN.
2. Card data fields, track 2 and/or track 3, depending on FIT specifications (card data data will be included only in the first interactive start of a transaction).
3. Transaction information fields, such as:
   a. Information on the Function select, To Account or From Account select key initiating the interactive start.
   b. The subclass associated with the active function select key.
   c. The language ID and institution message identifier used with this FIT entry.
   d. Sequence numbers; the interactive sequence number which is unique for each message sent from the terminal 14, and the transaction sequence number which is the same as the one that will be in the transaction request associated with this interaction.

Since interactive start messages are sent prior to a transaction request message, the host 12 may need to perform PIN validation after receiving the first interactive start message if terminal PIN validation was not specified.

FIG. 13 shows the format of an interactive start message communicated from the terminal 14 to the host 12 to begin an interactive transaction. Following an L field 380 which denotes the length of the messsage, an ISN field 382 provides the interactive sequence number. The interactive sequence number is included in all interactive messages transmitted between the terminal 14 and the host 12. It begins with 1 when the system is reset and it is incremented by 1 for each interactive start, interactive response and interactive status sent to the host 12. The host 12 uses the last interactive sequence number received from the terminal 14 in the interactive display and interactive completion messages. The interactive sequence number increases from 1 to 255, then begins again with 1.

A following C field 384 gives the class of the message which is "02" and a subsequent SC field 286 denotes the subclass of the message which is "01". A VAR field 388 which follows the SC field 386 provides a copy of the interactive sequence number.

A following TSN field 390 provides the transaction sequence number When the host 12 is first notified that a transaction is in progress, the transaction sequence number is incremented and placed in the notifying communication message. All succeeding terminal-to-host interactive and transaction messages associated with the transaction contain the same transaction sequence number. If no interactive message sequence is required during the data collection phase of the transaction, the updated transaction sequence number first appears in the transaction request message. If an interactive message sequence is required, the updated transaction sequence number first appears in the initial interactive start message associated with the transaction. Each succeeding interactive start, response and status message contains the same transaction sequence number but a different interactive sequence number. The transaction request message contains the same transaction sequence number as present in the interactive messages. The transaction sequence number can be used to tie interactive messages to their associated transaction request message. If an interactive transaction is terminated before a transaction request has been sent, the transaction sequence number associated with the initial terminal to host message of the next transaction is one greater than the transaction sequence number associated with the terminated transaction.

The following PIN field 392 denotes the personal identification number of the consumer. This is followed by a PIN TRY field 394 denoting the number of consumer PIN entry attempts that were made. Following the PIN TRY field 394 is a FLAG field 396. Bit 0 of this field indicates whether T2 is good, while bit 1 of this field indicates whether T3 is good. Bit 2 of the FLAG field 396 indicates if the PIN retry limit was reached while bit 3 thereof denotes PIN TRY override failure. Bit 5 of the FLAG field 396 denotes that the PIN is unchecked, while bit 6 indicates the presence of a two track card. A following TRANS SC field 398 provides the transaction subclass which is the subclass associated with the active function key.

An INTERACTIVE KEY field 400 provides the code number of the key triggering the interactive request. The numbers X'11'-X'18' denote the eight Function select keys 108. The numers X'21'-X'24' denote the four From Account keys 110. The numbers X'31'-X'34' denote the four To Account keys 112. If an alternate key code has been defined for the key in the key set table, the alternate key code is sent in place of the standard key code.

The following LID-IMI field 402 contains a 2-byte language table entry identifier field being used for this particular consumer. The first byte denotes the LID or language ID Value obtained from the financial institution table entry or from the credit card or from the consumer's response to a display requesting selection. The second byte denotes the IMI or institution message identifier which is a value obtained from the financial institution table entry being used.

Following a field separator field 404, a T2 DATA field 406 sets forth the data recorded in the T2 track of the credit card if such data is present. A following field separator field 408 separates the T2 DATA field 406 from a T3 MAP field 410 which is the track 3 data map field. A following T3 DATA field 412 contains the track 3 data, if present. The interactive start message is terminated by a field separator field 14.

Upon receipt of the interactive start message by the shot 12, the message processor 24 relays the interactive start message to the applications program 26. The applications program 26 responds by generating an interactive display message including one or more custom displays and communicating such message via the message processor 24 to the terminal 14. The format of such an interactive display mssage is shown in FIG. 14.

The host 12 sends an interactive display message to the terminal 14 when it has consumer selection items or option data to display to the consumer. The host 12 is responsible for formatting the information for the display, defining the amount of consumer data entry expected, and controlling the interaction in general.

The Major fields of an interactive display message are:

1. Display related fields which include:
    A. The actual page or screen definition data. This data may be customized page definitions or identification numbers calling out page definitions which reside in the terminal. There may be several pages in a message and there may be a mixture of customized and terminal resident pages in a display message.
    B. An indication of whether the entire selection set is included in the interactive display message.
2. Consumer data entry field, which defines the minimum and maximum length of the consumer entry data.
3. Verification field, which allows the host to include or identify a special verification message to use with a selection set and thus override the use of a default verification message. The host may also indicate that no terminal verification need take place.
4. Validation/Substitution fields which define a validation list to be searched by the terminal in response to a consumer data entry to determine if such entry is valid or erroneous and substitution data to be substituted for the consumer entered data in the event a match is found in the validation test.

The fields of the interactive display message of FIG. 14 include an L field 440 denoting the length of the message, an ISN field 422 providing the interactive sequence number which is copied from the last ISN received by the host, a C field 444 denoting the class of the message which is "0E" and an SC field 446 denoting the subclass which is "01". A following VAR field 448 provides a copy of the interactive sequence number.

The VAR field 448 is followed by an ID MSG FLAG field 450 which is an interactive display message flag. If bit 8 of this flag has the value "0", this denotes that the host 12 should be contacted for more pages if the consumer enters a change key on display of the last page of the message. If this same bit has the value "1" this denotes that the terminal should wrap to the first page of the display message if the consumer enters the change key on the display of the last page of the message. Bit 9 of this flag, if on, indicates that a verification step should occur after a consumer data entry. Bit 10 of this flag, if on, indicates that the decimal point is being used as a data delimiter (i.e. not a dollars and cents indicator). Bit 11 is a format standardization bit which insures that there are two digits following a decimal point in the amount by adding zeros if necessary. Bit 12 indicates whether consumer data entry is expected. Bit 13 indicates whether or not the substitution data consists of transaction definition bytes. Bit 14 indicates whether or not the transaction is to be cancelled.

The ID MSG FLAG field 450 is followed by a MIN CDEL field 452 and then an MAX CDEL field 454. The MIN CDEL field 452 specifies the minimum consumer data entry length for the selection set. The MAX CDEL field 454 specifies the maximum consumer data entry length for the selection set. If MIN=MAX=0, the only data entry allowed is the "OK" key or another control key. An LP field 456 indicates the total length of page definition data which follows. The page definition data consists of one or more pages, each of which is defined by a page flag field 458 and a page data field 460. Bit 0 of the page flag field 458 comprises a resident page flag. Bit 1 of the field is a verification page flag. If a verification page is present, it must be the first page in the selection set. The page data field 460 is of variable length and may consist of a length indication followed by a text stream.

Where validation or substitution data is present in the interactive display message, the last page data field 460 is followed by an LVS field 462 identifying the presence of such data and an LV field 464 indicating the presence and length of a following VALIDATION DATA field 466 which is of variable length and which contains validation data. If substitution data is also present, a following LS field 468 identifies the presence and length of a following SUBSTITUTION DATA field 470 which is of variable length and which contains substitution data to be used with the validation data of the field 466. Ther can be "N" sets of validation and substitution data, each of which includes the LV field 464, the VALIDATION DATA field 466, the LS field 468 and the SUBSTITUTION DATA field 470.

Within the page data field 460 the page ID is the resident page or message table ID number. Page numbers from 1 to 255 are available for display messages and numbers from 1 to 125 are available for printer messages. The following length indication and text stream of the page data field 460 are shown in FIG. 15. The first field 490 thereof denotes the length of the text stream. The fields following the field 490 comprise the text stream. In the example of FIG. 15 the text stream is comprised of three different text and display format control fields 492, 494 and 496 of variable length. The fields 492 and 494 are separated by an RS CODE POINT X'28' field 498 indicating that a resident message segment stored in the segment table of the terminal is to be inserted between the fields 492 and 494. An RES SEG ID field 500 following the field 498 identifies the segment resident in the segment table of the terminal which is to be inserted between the fields 492 and 494. The fields 494 and 496 are separated by a CDES CODE POINT X'29' field 502 which indicates that consumer entered data is to be inserted between the fields 494 and 496.

Each of the text and display format controls fields 492, 494 and 496 comprises displayable characters in the form of EBCDIC code points not assigned as control characters together with display format control characters.

The display format control characters and the function represented thereby are as follows:

| Function | Control Character | Explanation |
| --- | --- | --- |
| Line Feed | X'25' | The next character position is down one row. The horizontal position is unchanged. If Line Feed is detected while on the last row of the screen, it will cause a wrap to the first row of the screen. |
| Return | X'0D' | The next character position is position 1 on the current display row. |

| Function | Control Character | Explanation |
|---|---|---|
| New Line | X'15' | The current row is erased from the current position to the end of the row. The next character position is position 1 of the next lower row. If new line is detected while on the last row of the screen, the next character position is position 1 of the first row of the screen. |
| New Page (form feed) | X'OC' | The screen is completely erased; the next character position is position 1 of row 1. |
| Position | X'34' | This control character is followed by a flag byte in a 1-byte positioning value. Flag byte: Bit 4: 0 = position is absolute. 1 = position is relative. Bit 5: 0 = position change is horizontal. 1 = position change is vertical. Bits 6-7: 00 = move to new character position without erasing. 01 = erase from the current position the number of bytes specified by the position byte. 10 = move to new character position and erase the old position up to, but not including, the new position. The positioning byte indicates a row or character column number. It contains an unsigned binary value ranging from 0-255 to be used under direction of the flag byte; a 0 results in no operation. The value specified is divided by a modulus number to determine the resulting position. The modulus division produces a change of 1 to x rows for vertical positioning, and a change of from 1 to y character columns for horizontal positioning, where x is the maximum number of rows on a screen, and y is the maximum number of character columns in a row. |

Referring again to FIG. 3 it will be noted that within the terminal 14 the processor 60 is coupled to a message table 510, a segment table 512 and a consumer entered data table 514. Messages communicated to the terminal 14 from the host 12 during initialization are stored in the message table 510. Thereafter the processor 60 controls accessing of the messages in the table 510 for display by the multiline display 34 as the various operations of the transaction are sequenced through. Data entry keys utilize the standardized messages stored in the table 510. During execution of an interactive transaction the host can either utilize the messages stored in the table 510 or it can generate its own custom messages. Commonly used portions of messages are stored in the segment table 512. Each segment comprises a plurality of displayable characters and a plurality of display format control characters for the displayable characters in the same fashion as the fields 492, 494 and 496 of FIG. 15. However the segments do not have to be communicated with or stored with the rest of the display message. Instead, the display message as communicated or stored includes pairs of fields such as the RS CODE POINT X'28' field 498 and the RES SEG ID field 500. The field 498 which comprises the control character X'28' indicates that the following byte is a resident segment ID. The RESIDENT SEGMENT ID field 500 identifies which of the segments stored in the segment table 512 is to be inserted between the fields 492 and 494. During display of the message at the multiline display 34, the processor 60 of FIG. 3 inserts the displayable characters and the control characters therefor comprising the segment from the segment table 512 between the fields 492 and 494 of the message of FIG. 15.

During execution of a transaction, data entered by the consumer is routed by the processor 60 of FIG. 3 to the consumer entered data table 514 where it is stored. Display of the consumer entered data stored in the table 514 is accomplished by inserting the consumer entered data at an appropriate place within a message communicated from the host 12 to the terminal 14 or stored in the message table 510. Insertion of consumer entered data between the fields 494 and 496 in the message of FIG. 15 is provided by the CDES CODE POINT X'29' field 502. The presence of the control character X'29' in the field 502 causes the processor 60 to insert consumer entered data from the table 514 as the message of FIG. 15 is being displayed on the multiline display 34.

The interactive display message of FIG. 14 communicated by the host 12 to the terminal 14 is displayed to the consumer and requests data entry by the consumer. The consumer entered data results in an interactive response message being assembled by the terminal 14 and communicated to the host 12. The interactive response message contains either the data the consumer has entered in response to the display of a selection set or a paging indication in the case where an incomplete selection set has been sent and the consumer wishes to view additional pages of a selection set. The major fields of an interactive response message include consumer entry fields and an informational status field.

Displays from a selection set show a consumer a list of selection items from which a consumer is expected to make a selection. Depression of the CHANGE key means that no item on the page displayed was desired and that another page of data should be displayed. The processor 60 will display the next page of the selection set if it is available. A request that more pages be transmitted in an interactive message may be made for an interactive key if no more pages are available at the terminal 14. If the selection set is completely defined at the terminal 14 the first page of the selection set will be redisplayed. For a data entry key the selection set is always completely defined.

Depression of the OK key terminates data entry. An option may be selected where data entries must be terminated by the OK key. This includes depression of the OK key without entering any numerics, which is a null entry, entry of a numeric field of less than the maximum length, as well as entry of a numeric field of the maximum length. If this option is not selected then the OK key will be required only after variable length entries. Data entry will be terminated when the maximum amount of data is entered for fixed length entries, namely when the minimum equals the maximum. The consumer data entry minimum and maximum are established differently for data entry and interactive keys. For data entry keys the minimum and maximum values are established in the key definition table. For interactive keys they are received in the interactive message containing the selection set (display) data. The minimum and maximum values may be different for each selection set for interactive keys since they are established with the definition of the selection set. The minimum and maximum values pertain to the number of characters that may be entered. A decimal point and each numeric digit counts as a character. The minimum value must be greater than or equal to zero and less than or equal to the maximum. The maximum must be greater than or equal to zero and less than or equal to 20. A minimum and maximum value of zero means that no numerica field data is allowed but that the consumer must respond to the display with entry of the OK, CHANGE, or CANCEL key. This setting essentially indicates a view only mode of operation.

During consumer entry of data, any numeric key entry will be accepted. Entering the CORRECTION key will cause the previously entered data to be cleared but data entry is still expected. When the data entry is complete it will be checked to insure it falls within the minimum and maximum values established for the key. If the entry is out of range an error message will be displayed and the page viewed by the consumer at the time he entered data will be redisplayed. Data may then be reentered. If a validation list is present for the consumer data entry, the data entry is checked against the list to determine if the consumer data entry is valid or erroneous. If the consumer data entry is found in the validation list and substitution data is present, the substitution data is then substituted for the consumer entered data.

The format of an interactive response message is shown in FIG. 16. The message of FIG. 16 includes an L field 550 denoting the length of the message, an ISN field 552 containing the interactive sequence number, a C field 554 denoting the class of the message which is "03", an SC field 556 denoting the subclass of the message which is "01", a VAR field 558 which is a copy of the interactive sequence number, a TSN field 560 which is the transaction sequence number and an IR FLAG field 562 which provides an interactive response flag. If bit 0 of the field 562 is "0" it denotes consumer data entry transmission, and if "1" it denotes a page request indicating that another page of this selection set is requested.

Following the IR FLAG field 562, an LN field 566 denotes the length of a following consumer data entry field 568. The CONSUMER DATA ENTRY field 568 which is variable in length comprises keyboard data in EBCDIC form entered by the consumer in response to the display of pages received by the terminal in the last interactive display message. It may be the substitution data. In a remaining PAD field 570 characters X'F' are added as needed to make the message lenagh even and at least 12 bytes long.

After consumer data entry a verification step will be executed if indicated. For data entry keys, the key definition table specifies whether the option is selected and, if selected, the verification page identifier. For interactive keys this information is received in the interactive message containing the selection set data. In this case the verification message may be a page identified or a custom-defined verification message.

A verification message redisplays the data that a consumer entered so that he may verify that it is correct before going on to the next step. The verification message may be formatted in such a way that the consumer selection items from the display page are left on the screen along with the display of the data that was entered. Formatting of the verification message, like all other display messages, is under host control. A consumer may enter OK, CORRECTION or CANCEL. The OK key indicates the data entered is acceptable. CORRECTION indicates the data was invalid; the terminal 14 will then display the page displayed at the time of data entry so that the data may be reentered. CANCEL causes a termination of the transaction. Depression of previously active Function, From Account and To Account keys is a branch back situation. However, the transaction is not terminated; processing simply proceeds from the step branched to. Entry of the CHANGE or numeric keys will be ignored. If validation and substitution data were sent in connection with a display message, the validation list is searched and, if a match is found, the substitution data is substituted for the consumer entered data.

When the host 12 determines that an interactive transaction is complete, it generates and sends to the terminal 14 an interactive completion message. Receipt of this message causes the terminal 14 to carry out any actions indicated by the message and, if a non-error completion, proceed to the next transaction step. The major fields of an interactive completion message include display related fields. The sceen definition rules are as described for the display related fields of the interactive display message. However, additional pages of display data cannot be obtained from the host. Further major fields of the message include consumer data entry fields as defined for interactive display messages. Any data entered at this point will be sent to the host as part of the transaction request message. Still further fields of the message include verification and validation/substitution fields as defined for interactive display messages. The substitution field may contain transaction definition bytes which for a function select step can be used in lieu of the original transaction definition bytes for the particular function key involved for the duration of the transaction.

The format of an interactive completion message is shown in FIG. 17. The first five fields of the message of FIG. 17 are identical to the fields 550, 552, 554, 556 and 558 respectively of the message of FIG. 16, with the exception that the message class is "OF" in the case of FIG. 17.

The VAR field is followed by an IC MSG FLAG field 580 which is an interactive completion message flag. Bit 0 of the field indicates whether display data is present. Bit 1 indicates whether transaction definition bytes are present. If display data is present, bit 8 notes that the system is to return to the first page of the display message contained in the completion message if the CHANGE key is actuated on display of the last page of the message. Bit 9 notes whether there is a verification step after consumer data entry. Bit 10 notes if the decimal point will be used for an amount entry or as a data delimiter. Bit 11 is a format standardization bit which insures that there are two digits following a decimal place in an amount by adding zeros if necessary. Bit 12 indicates whether consumer data entry is expected.

The following MIN CDEL and MAX CDEL fields 581 and 582 respectively define the minimum and maximum length that consumer entered data can have. These fields are ignored if no consumer data is required.

In the LP field 583 the total length in bytes of the page definition data is given. The following PAGE FLAG field 584 comprises a page flag. Bit 1 of this field denotes a resident page flag.

The PAGE FLAG field 584 is followed by a PAGE DATA field 586. The PAGE DATA field 586 consists of display information which may require consumer data entry. The data itself is arranged in the form shown in FIG. 15. A plurality of pages can be present, each being designated by a separate PAGE FLAG field and a following PAGE DATA field.

Although not shown in FIG. 17, the PAGE DATA field 586 of the interactive completion message may be followed by validation and substitution data in the form of one or more of the groups of four fields 464, 466, 468 and 470 shown in FIG. 14. In addition, the SUBSTITUTION DATA field 470 can contain three TRANSACTION DEFINITION BYTES shown as a separate field 587 in FIG. 17. Bit 1 of the PAGE FLAG field 584 denotes whether a TRANSACTION DEFINITION BYTES fields 587 is present in substitution data.

In the first byte of the TRANSACTION DEFINITION BYTES field 587, bit 0 indicates whether a special step is required, which indication is ignored in the case of an interactive mode. Bits 1, 2 and 3 respectively indicate whether From Account, To Account, and Amount/Verify steps are required. Bit 4 indicates whether this is a "fast cash" key. The first four bits of the second byte respectively indicate whether a deposit statement, a deposit step, cart. 1 and cart. 2 are required. The fifth bit indicates whether chaining is allowed. The third byte denotes the subclass. It will be recalled that the three transaction definition bytes can be used in place of the bytes previously stored at the terminal during initialization for the remainder of a transaction involving a Function key.

The terminal 14 transmits an interactive status message to the host 12 when a non-closing exception condition occurs after at least one interactive message has been sent to the host. The message is sent to allow the host 12 to perform any necessary reinitialization or any termination procedures. If no interactive start message has been sent and a non-closing exception occurs, no interactive status will be sent. Status in this message is broken into three parts:

1. The first part divides exceptions into eight major categories.
2. The second part further divides the category into eight subcategories.
3. The third part is a descriptor code which defines the conditions within the subcategory.

If multiple exceptions are present, only the first will be reported (processing is discontinued on detection of an exception).

Examples of non-closing exception conditions which can cause an interactive status message to be sent include consumer cancel, consumer timeout on data entry, and an invalid message format on interactive messages received by the terminal 14. These conditions will cause termination of a transaction. An interactive status message will also be sent when a "branch back" situation occurs after an interaction has taken place. This will not cause a termination of a transaction.

Referring to FIG. 18 which shows the format of an interactive status message, the first part of the message includes an L field 590 denoting the length of the message, an ISN field 592 providing the interactive sequence number, a C field 594 denoting the class of the message which in this instance is "16", an SC field 596 which denotes the subclass which is "01", a VAR field 598 which provides a copy of the interactive sequence number and a TSN field 600 which provides the transaction sequence number.

An INTERACTIVE TRANSACTION TERMINATION STATUS field 602 follows the TSN field 600. As noted above, this field is broken into three parts. The first part divides exceptions into eight major categories. The second part further divides the category of exceptions into eight subcategories. The third part is a descriptor code which defines the conditions within the subcategory. The various different sets of data which can be denoted by the three different bytes of the interactive transaction termination status field 602 are as follows:

| INTERACTIVE STATUS | | | | | |
|---|---|---|---|---|---|
| Byte 0 | | Byte 1 | | Byte 2 | |
| Bit | Meaning | Bit | Meaning | Code | Meaning |
| 0 | Reserved | 0–7 | Reserved | X'00'–X'FF' | Reserved |
| 1 | Reserved | 0–7 | Reserved | X'00'–X'FF' | Reserved |
| 2 | Transaction Termination Condition | 0 | Abort Condition | X'00' | Reserved |
| | | | | X'01' | Consumer Action |
| | | | | X'02' | Alarm Condition |
| | | | | X'03' | Hardware Error |
| | | | | X'04'–X'FF' | Reserved |
| | | 1 | Message format error | X'00' | Reserved |
| | | | | X'02' | Length mismatch. The total length of an interactive message is less than it should be. |
| | | | | X'03' | Reserved |
| | | 2 | Message content error | X'00' | Reserved |
| | | | | X'01' | CDEL min > CDEL max |
| | | | | X'02' | CDEL max > 20 |
| | | | | X'03' | Wrong ISN received |
| | | | | X'04' | Page length error |
| | | | | X'05' | Invalid subclass in message header |
| | | | | X'06' | Transaction defn. byte error (request to turn on bit which is off, or change subclass to an invalid value; or present in FA or TA step) |

-continued

| INTERACTIVE STATUS | | | | |
|---|---|---|---|---|
| | | | X'07' | Incomplete selection set in data entry mode. |
| | | | X'08'-X'FF' | Reserved |
| | 3 | Host/ subhost request | X'00' | Reserved |
| | | | X'01' | Suspended |
| | | | X'02'-X'FE' | Reserved |
| | 4-7 | Reserved | X'00'-X'FF' | Reserved |
| 3 | Notification status | 0 | Branch Back | X'00' | Reserved |
| | | | X'01' | Funct. select step |
| | | | X'02' | From-account step |
| | | | X'03' | To-account step |
| | | | X'04'-X'FF' | Reserved |
| | 1-7 | Reserved | X'00'-X'FF' | Reserved |
| 4-7 | Reserved | 0-7 | Reserved | X'00'-X'FF' | Reserved |

As noted in connection with FIG. 12 actuation of an interactive key within the Function keys 108, the From Account keys 110 or the To Account keys 112 shown in the keyboard configuration of FIG. 4 produces an interactive start message to the host 12 followed by an interactive display message to the terminal 14, an interactive response message to the host 12 and an interactive completion message to the terminal 14. The formats of these messages were described in connection with FIGS. 12-17. The interactive sequence can therefore be summarized as follows:

1. The consumer presses an interactive key.
2. The terminal 14 sends an interactive start message with the necessary information to the host 12.
3. The host 12 transmits screen data containing additional options to the terminal 14 for display to the consumer in an interactive display message.
4. The consumer responds to the data displayed either by selecting an item or by indicating that additional items be displayed. The terminal 14 transmits either the consumer data or the request for more items (paging) in an interactive response message to the host 12.
5. When the host 12 wishes to end the interactive sequence, it sends an interactive completion message to the terminal 14.

Steps 3 and 4, the sending of the interactive display and the interactive response messages, may be repeated as many times as necessary before the interactive completion message is transmitted. There is no maximum on the number of interactive displays. However, if the host 12 has no option data to present to the consumer, it may send an interactive completion message immediately after receiving the interactive start message without sending any interactive display messages. This message may contain display data. After receiving the interactive completion message, the terminal 14 proceeds to the next stem in the transaction sequence. Interactions may occur in none, one, two or all three of the transaction steps which allow interactions. An interaction may also be initiated by the host at the time the transaction reply message is received by the terminal.

If error and exception conditions that can terminate a transaction occur after an interactive start message has been sent, but before the transaction request has been sent, an interactive status message describing the terminating condition is transmitted by the terminal 14 to allow the host 12 to take the appropriate termination actions. A typical interactive status message was described in connection with FIG. 18. The interactive status message is also sent when the consumer causes a "branch back" situation after an interaction has occurred. A branch back situation occurs when a consumer selects a key for a prior transaction step rather than a key for the transaction step he is on or selects another key in the same step he is on. The applications program 26 is signaled so that data collected during an interaction that may be invalidated by the reentry of a transaction step can be reinitialized.

Examples of non-closing exception conditions that can cause the interactive status message to be sent are:
1. Consumer cancel.
2. Consumer timeout on data entry.
3. An invalid message format on interactive messages received by the terminal.

An interactive status message is also sent when a "branch back" situation occurs after an interaction has taken place. This does not cause a termination of a transaction.

MESSAGE SEGMENTATION INCLUDING MULTILANGUAGE OPTION

As previously described in connection with FIG. 3 standardized messages communicated to the terminal 14 from the host 12 during initialization are stored in a page or message table 510. Customized messages generated by the host as part of an interactive transaction are sent to the terminal for display. Each message, whether standardized or custom, may incorporate one or more message segments stored in a segment table 512. In a multilanguage option shown in FIG. 19, the terminal 14 is provided with a base message table 650, other message tables 652, a base segment table 654 and other segment tables 656. The base message table 650 and the base segment table 654 function in the same manner as and correspond to the message table 510 and the segment table 512 respectively of the arrangement of FIG. 3. However, in addition to the processor 60 being coupled to the base message table 650 and the base segment table 654 for operation in the manner described in connection with FIG. 3, the processor 60 is also coupled to a language table 658 which makes possible various different combinations of the message tables 650 and 652 and the segment tables 654 and 656.

The multilanguage option allows a display message table and/or segment table to be associated together and selected for use during a transaction or transaction chain. At the end of a transaction or transaction chain the base message table 650 and/or base segment table 654 is used. The language table 658 contains entries which associate a message table and a segment table. The language table 658 contains as many entries as required to define all the message and segment table combinations to be used at the terminal 14.

Figure 19:
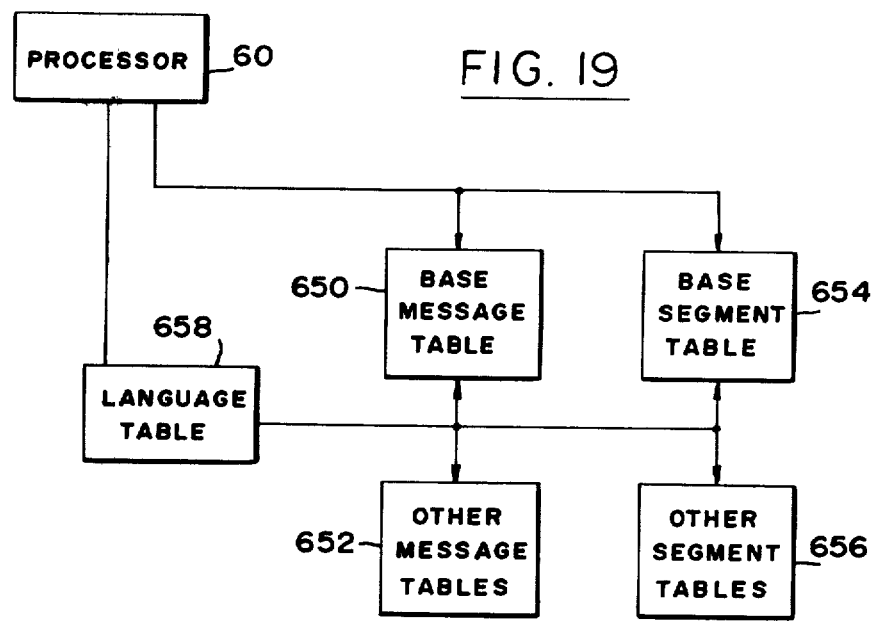
FIG. 19 is a block diagram of a portion of the terminal of the arrangement of FIG. 1B used in a multilanguage option.

The options provided by the arrangement of FIG. 19 are useful in situations such as where transaction processing is to be made available in two or more different languages. Various countries and various parts of countries include people who speak two, three or more different languages. In such instances a consumer is able to request transactions in his native language using his credit card or by choosing from a display menu of languages. The language table 658 responds to the credit card data by selecting the appropriate message table and segment table for that language.

To select one of the other message tables 652 instead of the base message table 650 or one of the other segment tables 656 rather than the base segment table 654, fields must be present in the financial institution table 100 shown in FIG. 3 that identify either or both a language ID (LID or the location of the language ID on the credit card) and an institution message ID (IMI). The LID allows entry selection based on the language. The IMI allows entry variation based on institution needs. An example is when a savings and loan wants different messages from a bank which may reference checking accounts, and so on. Using both parameters allows entry selection based on institution and language needs.

Figure 20:
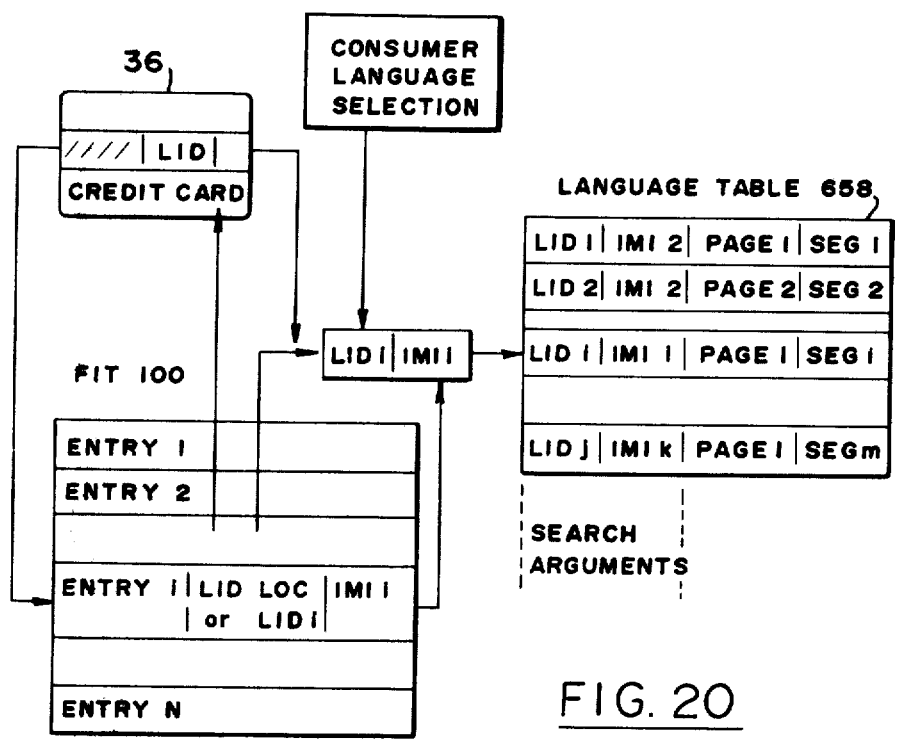
FIG. 20 is a detailed block diagram of a portion of FIG. 19.

An alternate form of operation can be used when the language code is located on the credit card and two institutions joining together in a pool use the same language code value but want to use different tables. Each institution is assigned different institution message identifiers (IMI) which allows each institution to use its own set of tables even though the institutions are using the same language code. Thus, neither institution needs to reissue its cards because of a language code conflict. Referring to FIG. 20 which shows the language table 658 in greater detail in conjunction with the financial institution table 100 and a credit card 36, when the credit card 36 is entered the financial institution table 100 is searched for an associated entry. At the host's option the consumer may choose a language from a list displayed at the terminal. This will override the language specified on the card or in the FIT. If the associated entry specifies a LID and/or IMI, then the LID and/or the IMI are used to identify an entry in the language table 658 to be used for the transaction or transaction chain. The language table 658 selects the appropriate message (page) table and segment table.

The message table number and the segment table number can be any decimal integers in the range 1-9. Either or both the LID and the IMI may have default values (which are 0). The default LID and IMI use the base message table 650 and the base segment table 654. A default IMI means that the language table 658 is searched for an LID match only. Conversely, a default LID means that the language table 658 is searched for an IMI match only.

It is occasionally desired to change one or more of the messages stored in the message table 510 within the terminal 14 rather than to replace the message with a new one. To accomplish this the applications program 26 within the host 12 generates and communicates to the terminal 14 a change display message command. The format of such a message is shown in FIG. 21. The format includes an L field 750 denoting the length of the message, an N field 752 providing the transaction sequence number, a C field 754 providing the class which is "X'OC'" and an SC field 756 which indicates the subclass which is "X'OF'". A C2 field 758 contains the value of the second bill counter where there are two bill counters at the terminal. The following C/SC field 760 denotes concatenation of class and subclass "X'CF'". The following C1 field 762 contains the value of the first bill counter. The following MN field 766 provides the message number which is a one byte binary field containing the message number of the message to be replaced in the message or segment table indicated. The following ML field 768 denotes the message length in terms of the number of bytes of the message field. This value may not exceed 238. The following MSG field 770 contains the message. This is a varible length EBCDIC field that contains the new page or segment that is to replace the page or segment in the table indicated. A following FLAG field 772 indicates whether the MN field represents a page number or a segment number. An IMI field 774 at the end of the message is the message table identifier which is used in conjunction with the SPEC field 764 which contains the language identifier to search the language table for an entry. An entry has the address of the page or segment table where the message is to be changed. Bit 0 of the FLAG field 772 indicates whether a page or segment is to be changed.

Display message segmentation in accordance with the invention in which often repeated segments of messages are stored at the terminal for ready incorporation into messages communicated to the terminal from the host provides a number of advantages. Such advantages include the reduction of the amount of local storage required in the terminal to store the display messages, a reduction of the number and size of communication messages required to complete an interactive transaction, a reduction of the time delays introduced by transmission of long interactive messages, and assistance in customization of multiline display messages. Changing the contents of a segment definition changes the display messages containing the segment. Thus, promotional messages or time and temperature data which change over time and appear in more than one display message can be changed by altering the specific segment data without the requirement to individually change each display message that contains the information.

In the present example the multiline display 34 includes a screen capable of displaying six lines of 40 characters each or up to 240 characters. In an interactive environment where the host communication message has a maximum length of 250 bytes, it is important to pack as many display message definitions as possible in a single communication message in order to avoid multiple interactive message sequences for a single related set of data items. Segmentation provides a means of shortening custom display definitions so that more than one can be contained in each communication message. This minimizes the number of communication messages required to complete an interactive transaction.

As noted in connection with FIG. 15 the text stream portion of a display message may include displayable characters, display format control characters, segmentation control characters and CDES (consumer data entry) control characters. These elements can appear in any order in the text stream. The displayable characters are EBCDIC code points equal to or greater than X'40'. Undefined control characters are EBCDIC code points less than X'40' that are not assigned as CDES control characters, resident segment control characters or format control characters. When encountered in a display message definition, undefined control characters are displayed as a solid box the size of the dot matrix.

Displayable characters are defined by EBCDIC code points equal to or greater than X'40'. Up to 227 displayable characters may be defined in the character set. A page definition consisting entirely of displayable characters results in the first character of the string being placed in the upper left corner of the display with succeeding characters being placed in sequence from left to right and from top to bottom on the display. When the maximum number of characters has been placed on a line, succeeding characters are placed at the leftmost character position of the next line. After the screen has been completely filled, any additional characters are placed beginning at the upper left character position of the screen with succeeding characters being placed according to the character positioning rules described above. In this mode of operation, "space" characters are included in the proper places to provide the desired display appearance.

The format control characters provide a method for positioning strings of displayable characters, thereby removing the need to use "space" characters to format a display message and therefore resulting in a corresponding decrease in the size of the display message definition. As previously noted, the format control characters include line feed, return, new line, new page and position select.

As previously noted, each segment consists of displayable characters, format control characters and in some cases a consumer data entry segment (CDES) control character. Segments represent phrases, lines, partial display message definitions, or boiler plate information available for use as building blocks in complete display message definitions. Each resident segment (RS) in the segment table 512 is assigned a unique segment identifier. Up to 255 segments may be stored in the segment table 512. These segments can be included in display message definitions by using the resident segment control character which is contained in the field 498 in the example of FIG. 15. The byte following the control character is interpreted as a segment I.D. and is contained in the field 500 in the example of FIG. 15. When encountered in a display message definition, the resident segment identified by the resident segment control character/segment I.D. pair is logically inserted in the display message definition. The resident segment is treated as if it had been explicitly included in the display message definition. After the resident segment has been interpreted, processing returns to the original display message definition. Any number of segments can be included in a display message definition.

A resident segment definition may not contain a resident segment control character. This prevents segments from including other resident segments as part of their definitions, thereby eliminating circular segment definitions which might otherwise occur.

The consumer data entry segment (CDES) control character represents buffer space available for data to be entered by the consumer via the keyboard. Again referring to the example of FIG. 15, the CDES control character is contained in the field 502. Occurrence of the CDES control character causes the terminal to refer to the consumer entered data table 514 and to insert any consumer entered data stored therein into the message. The length of the CDES data is determined by the maximum amount of digits the consumer is allowed to enter in a given situation. Unentered digits up to the maximum will be displayed as spaces. After the CDES has been interpreted, processing returns to the original page definition.

A typical six line display message is as follows:
ENTER CODE AND PRESS OK KEY
105—ORDER CHECKS
63—PAY TELEPHONE BILL
41—MAKE HOME MORTGAGE PAYMENT
6—MAKE AUTOMOBILE LOAN PAYMENT
FOR OTHER CHOICES, PRESS CHANGE KEY This type of message is sent to the terminal 14 by the host 12 as the result of the consumer selecting a transaction key specified as interactive and the terminal 14 notifying the host 12 of the transaction key selected. Each of the six lines of this message is stored as a separate segment in the segment table 512.

The display message definition for the six line display noted above and which would be stored in the message table 512 is shown in FIG. 22. The definition of FIG. 22 includes an L field 800 denoting that the message definition is 16 bytes in length. The following NP field 802 comprises a new page control character. This results in clearing of the screen and readying of the display to begin printing characters in the upper lefthand corner of the screen. The following RS field 804 contains a resident segment control character which is followed by the segment I.D. in field 806. A following CDES field 808 contains a consumer data entry segment control character indicating the maximum number of spaces that can be reserved. The following NL field 810 is a new line control character indicating that the next line of the display is to be addressed. The remainder of the message definition of FIG. 22 consists of pairs of bytes denoting the five remaining segments in the message. The first byte of each pair comprises the resident segment control character, and the second byte of each pair is the segment I.D. number.

The first line of the six line display example noted above which reads "ENTER CODE AND PRESS OK KEY" is a general guidance line used with every display requesting selection by the consumer. Line 6 which reads "FOR OTHER CHOICES, PRESS CHANGE KEY" is a special guidance line required whenever the list of choices exceeds the one page screen capacity. The second through the fourth lines which read "105-ORDER CHECKS; 63-PAY TELEPHONE BILL AND 41-MAKE HOME MORTGAGE PAYMENT" represent a subset of the special financial transactions provided by the card issuing institution. The subset has been customized to those transactions applicable to the consumer currently using the machine.

An appreciation of the saving in transmission time and storage space required can be gained when it is considered that the message definition of FIG. 22 consists of only 16 bytes. Line 1 of the message by itself would require 32 bytes if segmentation were not available. The length of the display definition required to define the entire six line message without the use of segmentation is 187 bytes. Whereas only one message definition 187 bytes in length could be included in an interactive display message which permits a maximum of 256 bytes, over ten display messages in the 16-20 byte range can be included in one interactive display message from the host.

The invention can be better understood by considering an example of an interactive transaction together with the various messages displayed in connection therewith. Initially, the prior transaction has ended and the terminal 14 has sent a status message to the host 12. The terminal 14 displays the following message, which was previously generated by the host 12, to the consumer:

1. INSERT CREDIT CARD TO BEGIN TRANSACTION
2. GOOD DAY
3. DATE: OCT. 14, 1977
4. WEATHER: 40% CHANCE OF RAIN TODAY
5. NEWS: YANKEES WIN WORLD SERIES
6. USE OUR NEW ATM LOCATED IN OAKRIDGE MALL

The consumer responds to the message by inserting his credit card. The credit card is read by the terminal 14 which fails to find an entry in the financial institution table 100. The terminal 14 sends a message to the host 12 requesting search of a virtual financial institution table within the host. In the meantime the terminal 14 displays the following message to the consumer:

1. WAIT - YOUR CARD IS BEING PROCESSED
2. WE PLAN TO INSTALL MORE 'MONEY TREE'
3. MACHINES IN THIS AREA. LET US KNOW
4. WHERE YOU THINK THEY SHOULD BE
5. LOCATED
6. USE OUR NEW ATM LOCATED IN OAKRIDGE MALL

The host 12 finds an entry in the virtual financial institution table for the credit card and sends the entry to the terminal 14. The terminal 14 responds by processing the fields of the entry and sending a status message to the host 12. The terminal 14 then displays the following message to the consumer:

1. KEY PERSONAL INDENTIFICATION NUMBER
2. 
3. 
4. 
5. 
6. USE OUR NEW ATM LOCATED IN OAKRIDGE MALL

The consumer responds by entering his personal identification number (PIN). The terminal 14 validates the PIN and displays a function select message to the consumer as follows:

1. CHOOSE TRANSACTION TYPE - USE BLUE KEYS
2. 
3. 
3. 
4. 
5. WE ARE OPEN SATURDAYS FROM 10:00 AM TO
6. 1:00 PM

In the present example the consumer responds by choosing the "ADDITIONAL FUNCTION" transaction key which is determined to be an interactive function key. The terminal 14 sends an interactive start message to the host 12. The host 12 responds by sending an interactive display message to the terminal 14. The terminal 14 responds by displaying the first page of selection set 1 of the interactive display message which is as follows:

1. ENTER TRANSACTION CODE
2. 001—ORDER CHECKS
3. 002—PAY TELEPHONE BILL
4. 003—PAY WATER BILL
5. 004—PURCHASE SAVINGS BOND - SERIES F
6. FOR OTHER CHOICES, PRESS CHANGE KEY

The consumer responds to this message by actuating the "CHANGE" key. The terminal then displays the second page of selection set 1 of the interactive display message as follows:

1. ENTER TRANSACTION CODE
2. 005—PURCHASE SAVINGS BOND - SERIES E
3. 006—PAY HOME MORTGAGE
4. 007—PAY AUTO LOAN
5. 008—PAY GAS AND ELECTRICITY BILL
6. FOR OTHER CHOICES, PRESS CHANGE KEY

The consumer responds to this message by entering "005" indicating that he wishes to purchase savings bonds. The terminal 14 receives the consumer entered data and displays the following verification message:

1. YOU KEYED IN 005
2. PRESS "OK" TO CONFIRM
3. PRESS "CORRECTION" TO REENTER
4. 
5. 
6.

The consumer actuates the "OK" key, and the terminal 14 responds by communicating the previously entered data requesting purchase of savings bonds to the host 12 as part of an interactive response message. The host 12 sends an interactive display message with more display data in the form of selection set 2 to the terminal 14. The terminal 14 displays page 1 of selection set 2 requesting choice of bond denomination. This display is as follows:

1. ENTER BOND DENOMINATION
2. $25.00
3. $50.00
4. $75.00
5. $100.00
6. $500.00

The consumer responds by entering "50.00". The terminal 14 then displays the following verification message:

1. YOU ENTERED 50.00
2. PRESS "OK" TO CONFIRM
3. PRESS "CORRECTION" TO REENTER
4. 
5. 
6.

The consumer actuates the "OK" key, and the terminal 14 responds by transmitting the previously entered data selecting $50.00 denominations to the host 12. The host then sends an interactive display message containing more display data in the form of selection set 3, and the terminal 14 displays page 1 of selection set 3 which requests the number of bonds to be purchased and which is as follows:

| 1 | KEY IN NUMBER OF $50 BONDS | | | | | |
|---|------|-----|------|-----|------|-----|
| 2 | NO. | COST | NO. | COST | NO. | COST |
| 3 | 1 | $37.50 | 5 | $187.50 | 9 | $337.50 |
| 4 | 2 | $75.00 | 6 | $225.00 | 10 | $375.00 |
| 5 | 3 | $112.50 | 7 | $262.50 | 11 | $412.50 |
| 6 | 4 | $150.00 | 8 | $300.00 | 12 | $450.00 |

The consumer responds to the message by entering "30". The terminal 14 responds by displaying the following verification message:

1 YOU ENTERED 30
2 PRESS "OK" TO CONFIRM
3 PRESS "CORRECTION" TO REENTER
4
5
6

The consumer realizes he has made a mistake in entering "30" and actuates the "CORRECTION" key, resulting in redisplay of the following message:

| 1 | KEY IN NUMBER OF $50 BONDS | | | | |
|---|---|---|---|---|---|
| 2 | NO. | COST | NO. | COST | NO. | COST |
| 3 | 1 | $37.50 | 5 | $187.50 | 9 | $337.50 |
| 4 | 2 | $75.00 | 6 | $225.00 | 10 | $375.00 |
| 5 | 3 | $112.50 | 7 | $262.50 | 11 | $412.50 |
| 6 | 4 | $150.00 | 8 | $300.00 | 12 | $450.00 |

The consumer responds to this message by entering "3". The terminal 14 responds by displaying the following verification message:

1 YOU ENTERED 3
2 PRESS "OK" TO CONFIRM
3 PRESS "CORRECTION" TO REENTER
4
5
6

The consumer actuates the "OK" key, and the terminal 14 responds by communicating the request for purchase of three bonds to the host 12 in an interaction response message. The host 12 sends an interactive display message with more display data in the form of selection set 4. The terminal 14 displays the first page of selection set 4 which requests entry of "FROM ACCOUNT" information and which is as follows:

1 KEY IN ACCOUNT NUMBER TO BE BILLED
2 010 CHECKING
3 020 SAVINGS
4 030 SPECIAL ACCOUNT #417638
5 040 MASTER CHARGE
6 050 VISA

The consumer responds to this display by entering "30". The terminal 14 then displays the following verification message:

1 YOU ENTERED 30
2 PRESS "OK" TO CONFIRM
3 PRESS "CORRECTION" TO REENTER
4
5
6

The consumer responds to this message by actuating the "OK" key. The terminal 14 sends the latest consumer entered data to the terminal 14 as part of an interactive response message. In the meantime the terminal 14 displays the following message to the consumer:

1 PLEASE WAIT—YOUR REQUEST IS BEING
2 PROCESSED
3
4
5 OPEN A $600 TIMED SAVINGS ACCOUNT AND
6 RECEIVE A COLOR TV. CALL US TODAY!

The host then sends an interactive completion message to the terminal, and the terminal sends a transaction request to the host.

The host 12 then sends a transaction reply message to the terminal 14 containing the following transaction verification message which is displayed by the terminal 14:

1 YOU ARE BUYING 3 $50, SERIES E BONDS
2 AT A TOTAL COST OF $112.50
3 FROM SPECIAL ACCOUNT #417638
4 HIT OK TO PURCHASE BONDS
5 PRESS CANCEL TO CANCEL TRANSACTION
6

The consumer responds by actuating the "OK" key, thereby terminating the transaction.

It will be appreciated by those skilled in the art that transaction execution systems in accordance with the invention increase an institution's functions on two levels. First, they provide a functional increase to the owning institution, allowing it to provide more services to its own consumers. Secondly, the invention provides the basis to allow this functional increase to be enjoyed by pools of institutions. The formation of pools is desirable because it allows the cost of a terminal to be shared across several institutions. The invention facilitates the development of pools by enabling each institution to customize its transactions as it desires without the need to have its own terminal.

The multiline display allows an individual display to be more informative to the consumer, thus making it easier for the consumer to use the terminal. The display also provides an institution the capablility of displaying promotional messages or information about new procedures or hours which may be important to the consumer. Furthermore, the display opens the way for more complex transactions to take place since these may require more instructional information to be given to the consumer.

The data entry key function allows an increase in function at a minimal cost to the institution. A greater variety of transaction types and choice of accounts are possible without a significant increase in the complexity of the system or in communications line time.

The interactive function enables a system to provide an almost limitless variety of transactions to its consumers. In addition, it allows personalization of transactions to a consumer.

The segmentation feature used in conjunction with the multiline display is advantageous with respect to the various features noted above in that it optimizes the storage and transmission of the longer display messages.

For a pool of institutions, systems in accordance with the invention allow customization of the availability of transaction types and hence the variety of options it wishes to describe to the consumer. Furthermore, the content of the displays to the consumer can be customized. Thus institutions A and B may have their own promotional messages even though they are operating on the same terminal. The ability to customize both transaction types available and display contents allows any member of a pool to enjoy all of the features described previously for an individual institution.

As noted above the interactive function makes the kinds and types of transactions that can be performed almost limitless. Some of the possible transactions include the following:

1. Electronic Bill Payment—Funds can be transferred from any account to any cooperating bill collector.

2. Split Deposit—A check can be deposited with funds being withdrawn from that same check.

3. Purchase of Saving Bonds—As seen in the above example such things as savings bonds can be purchased in a variety of denominations.

4. Account Balance Information—Information on all accounts at a bank can be obtained.

5. Loan Status—Inquiry can be made as to the status of all loans with a bank. A breakdown on any individual loan can be obtained including such information as interest and principal paid. Additional payments to principal can be made.

6. Check Ordering—More checks can be ordered by the consumer.

7. Fund Transfers Between Accounts—Funds can be easily transferred between accounts, facilitating such things as the transfer of funds into a Christmas Club account or a children's savings account.

8. Display Variety—General information displays can be made up to describe things such as how to use the terminal, bank hours available, stock market reports, weather reports, types of loans available from a bank, interest rates, lengths of loans, minimum monthly payments and how to open an account.

9. Loan Application—Typically, the institution has much of the information about the consumer already needed to process a loan application so that all that may be needed is the amount and length of a loan and the reason for the loan (i.e. car, home improvement, personal). Furthermore, the terminal and its variety of displays can be used to request an extension on an existing loan. In the case of a loan application, the institution takes the information resulting from the transaction and prepares the loan application papers which are then sent to the consumer for approval.

10. Tax Preparation Aid—Consumers can request a printout of tax related information such as interest paid on loans and interest received on savings accounts, requiring minimal teller intervention. This information is easily gathered and mailed to the consumer.

Figure 23:
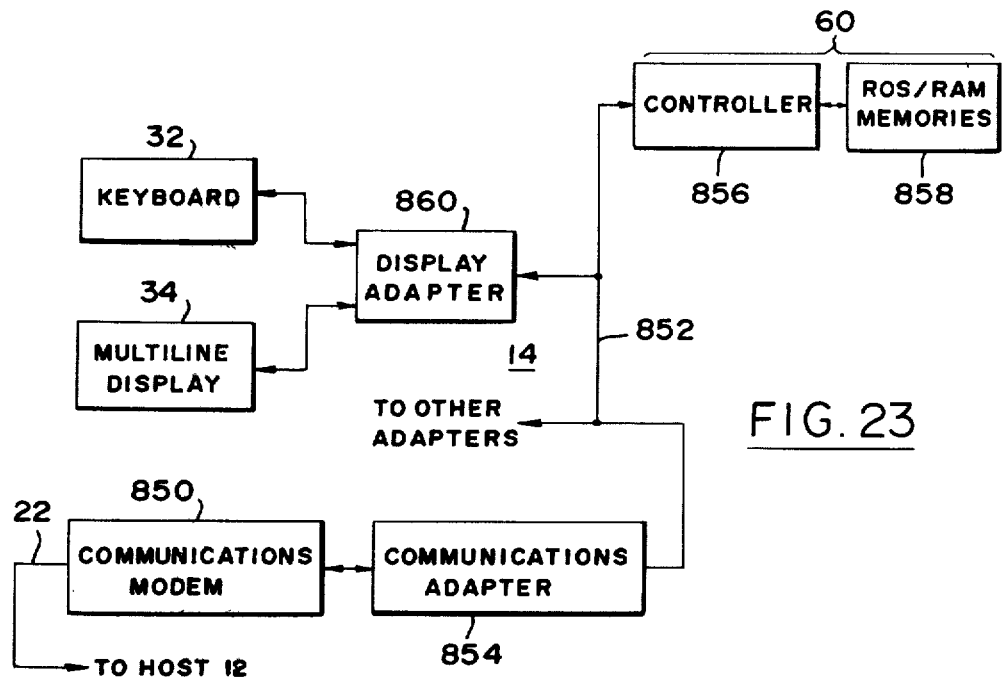
FIG. 23 is a block diagram of the transaction terminal of FIG. 1B.

FIG. 23 is a block diagram of a particular circuit which may be used to implement the various portions of the transaction terminal 14 shown in FIG. 3. The terminal 14 is shown in conjunction with the keyboard 32 and the multiline display 34 and includes a communications modem 850 coupled to the host 12 via one of the communication channels 22. The modem 850 provides modulation and demodulation of the various messages communicated between the host 12 and the terminal 14. Such modulation/demodulation is for ease of communication of the message signals and does not in any way alter the information contained within the messages. The communications modem 850 is coupled to a pair of unidirectional buses 852 by a communications adapter 854. The communications adapter 854 provides an interface between a controller 856 forming a part of the terminal 14 and the host 12.

The controller 856 combines with a plurality of ROS/RAM memories 858 to form the processor 60 and the various tables shown in FIG. 3. The controller 856 includes an eight bit microprocessor. Microprograms for the processor are stored in one or more ROS memories within the memories 858. At least one RAM memory within the memories 858 is used as a working area and for storage of microprogram control tables. During initial program load (initialization) the host 12 communicates to and loads the memories 858 with the financial institution table 100, the base key set table 104, the custom key set table 106 and where desired the language table 658 and the other message and segment tables shown in FIG. 19 as needed to implement the multilanguage option. Portions of the memories 858 also form the active keyboard buffer 118, the message table 510, the segment table 512 and the consumer entered data table 514.

The controller 856 responds to the various messages from the host 12 routed thereto via the buses 852 as well as to the keyboard 32 which is coupled to the buses 852 via a display adapter 860. The display adapter 860 also couples the controller 856 to the multiline display 34. The controller 856 responds to operation of the various keys of the keyboard 32 by sequencing through the various transaction steps requested thereby under the control of the microprograms stored in the memories 858 and by generating and communicating appropriate messages to the host 12 via the buses 852, the communications adapter 854 and the communications modem 850. Messages communicated to the terminal 14 from the host 12 are passed by the communications modem 850, the communications adapter 854 and the buses 852 to the controller 856 which processes the messages in accordance with the microprograms and other information stored in the memories 858. Standardized messages stored in the memories 858 and custom messages communicated by the host 12 and which are temporarily stored in the memories 858 are applied to the display adapter 860 for display by the multiline display 34 as described in detail hereafter in connection with FIG. 24.

In addition to coupling the controller 856 to the communications adapter 854 and the display adapter 860, the buses 852 couple the controller 856 to various other adapters used in executing transactions. Such other adapters are conventional components of the type used in the prior systems previously referred to as, for example, in the case of FIG. 2. Such other adapters typically include a credit card reader/timer (CCT) adapter, a control adapter, a monitor adapter and a printer adapter. The CCT adapter generates a periodic timing interrupt for use by the controller 856. The CCT adapter also functions to read the consumer's credit card, and in this connection is operative to separate data signals from clock signals, to deserialize the data and to present the data, one byte at a time, to the controller 856. The control adapter comprises a necessary interface between the controller 856 and various standard components forming a part of the terminal including such things as bill dispensers and the mechanism used to recieve bills, checks and other documents entered by the consumer at the depository at the keyboard. The monitor adapter provides an interface between the controller 856 and certain panels including a backup memory used to retain pertinent data in the event of a power failure. The printer adapter provides an interface between the controller 856 and a printer where a printer is used with the system to print account statements and other documents issued to the consumer at the terminal.

Figure 24:
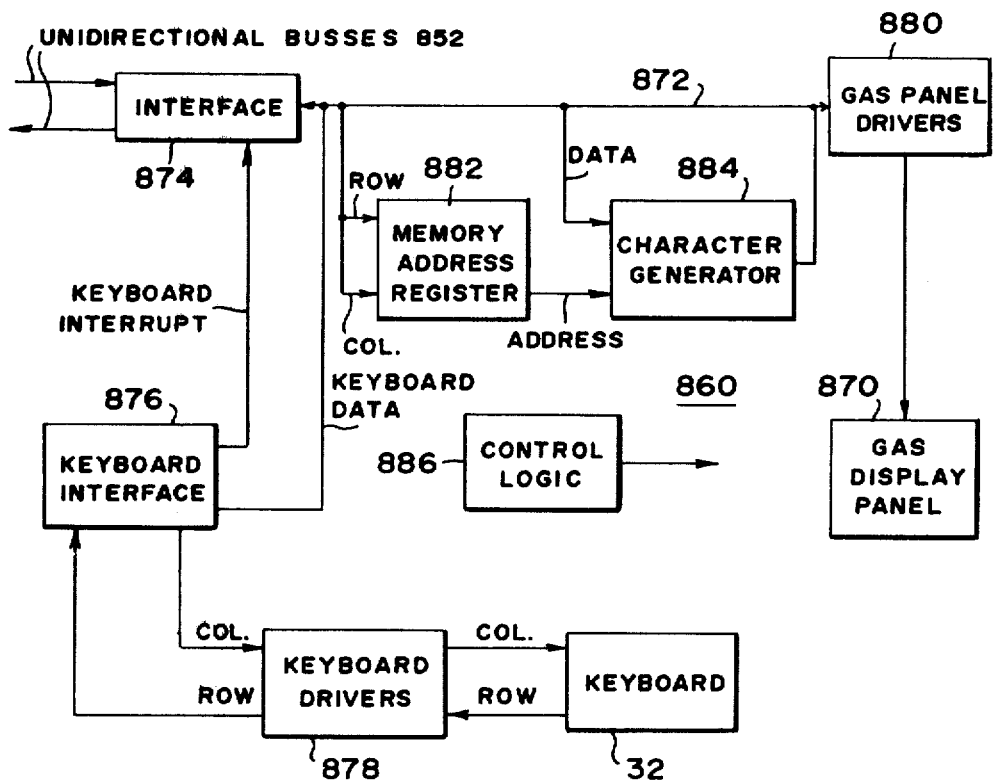
FIG. 24 is a detailed block diagram of the display adapter of FIG. 23.

FIG. 24 depicts an example of the display adapter 860 in conjunction with the unidirectional buses 852, the keyboard 32 and the multiline display 34 which is principally comprised of a gas display panel 870. The display adapter 860 includes a bus 872 which is coupled to the unidirectional buses 852 by an interface 874. The interface 874 is coupled both to the bus 872 and to a keyboard interface 876 for the keyboard 32. The keyboard 32 is coupled to the keyboard interface 876 via keyboard drivers 878.

When one of the keys of the keyboard 32 is depressed, the keyboard interface 876 responds by sending a keyboard interrupt signal to the controller 856 via the unidirectional buses 852. The controller 856 responds by sending a message which causes the keyboard interface 876 to determine the key that was depressed. The various keys of the keyboard 32 are identified in conventional matrix fashion by signals representing the column and row position of each key within the matrix. The keyboard interface 876 responds to the column and row signals by generating keyboard data in the form of identification of a key depressed which is communicated to the controller 856 via the interface 874 and the unidirectional buses 852.

Display of messages stored in the memories 858 is accomplished by the controller 856 in conjunction with the display adapter 860. The format character for each writable character of the display is communicated by the controller 856 to the interface 874 where it is routed via the bus 872 to gas panel drivers 880 for the gas display panel 870. A signal acknowledging receipt of the format character is sent to the controller 856, and the controller 856 responds by communicating the writable character to be displayed to a memory address register 882 via the interface 874. The register 882 addresses a character generator 884 in matrix fashion using the row and column information represented by the writable character from the controller 856. The resulting modulation bits for the character located within the character generator 884 are provided to the gas display panel 870 via the drivers 880 to provide display of the character. Operation of the arrangement of FIG. 24 is controlled by control logic 886. The logic 886 can comprise any appropriate apparatus such as a hard wired logic processor.

While the invention has been particularly shown and described with reference to a preferred embodiment thereof, it will be understood by those skilled in the art that various changes in form and details may be made therein without departing from the spirit and scope of the invention.

What is claimed is:

1. For use in a transaction execution system which is shared by a plurality of institutions and which includes at least one terminal remote from and in communication with a host data processing system, a terminal comprising:

keyboard means operable by a customer of a specific one of said institutions for entering transaction data and including a plurality of transaction keys representing different transaction steps selectively operable by said customer, communication port means for receiving keyboard control data blocks from a host data processing system;

first storage means for storing a plurality of keyboard control data blocks received from the host data processing system and unique to the respective institutions, each said keyboard control data block assigning a particular one of a plurality of different key states to each of said plurality of transaction keys;

means responsive to entry by the customer of data identifying said specific institution for locating the keyboard control data block corresponding to said specific institution; and transaction processing means responsive to selection by the customer of one of the plurality of transaction keys and to entry of the institution identifying data for processing a transaction step represented by the selected transaction key in accordance with the key state assigned to the selected transaction key by the keyboard control data block located by the entry responsive means;

whereby the processing at said terminal of transaction keys activated by said customer of a specific institution to select transaction steps is performed in accordance with respective key states assigned to said transaction keys by said specific institution via the communication port means from the host data processing system.

2. The terminal of claim 1, wherein said key states include a standard state, a data entry state, and an interactive state, and wherein said communication port means also communicates transaction data to the host data processing system;

said transaction processing means being responsive to activation of a transaction key assigned to said standard state to process the transaction step within the terminal without requiring further action by said customer;

said transaction processing means being responsive to activation of a transaction key assigned to said data entry state to process the transaction step within the terminal and request at least one entry of transaction data by said customer; and said transaction processing means being responsive to activation of a transaction key assigned to said interactive state to process the transaction step within the terminal and request at least one entry of transaction data by the customer for communication to the host data processing system via said communication port means for additional processing with respect to that specific transaction step.

3. The terminal of claim 1, further including card reader means for reading encoded data on an identification card presented to the terminal by a customer, the encoded data including said institution identifying data.

4. The terminal of claim 1, wherein said first storage means includes means for storing a financial institution table and a plurality of key set tables, said financial institution table identifying at least one of said plurality of key set tables for each of a plurality of different institutions and each of said plurality of key set tables assigning a particular key state to at least some of the plurality of transaction keys.

5. The terminal of claim 4, wherein said plurality of key set tables including a base key set table having a base set of key state assignments for the plurality of transaction keys and at least one custom key set table having a custom set of key state assignments for at least some of the plurality of keys which are different from the key state assignments for the keys in the base key set.

6. A transaction execution system which is shared by a plurality of institutions and which includes a plurality of terminals, each remote from and in communication with a common host data processing system, characterized in that each terminal comprises:
   keyboard means operable by a customer of a specific one of said institutions for entering transaction data, and including a plurality of transaction keys operable by said customer for selecting different transaction steps;

communication port means for receiving keyboard control data blocks unique to the respective institutions from the host data processing system, and for communicating transaction data to the host data processing system;

first storage means for storing a plurality of said keyboard control data blocks, each said keyboard control data block assigning a particular one of a plurality of different key states to each of said plurality of transaction keys;

first locating means responsive to entry by the customer of data identifying said specific institution for locating the keyboard control data block corresponding to said specific institution; and first transaction processing means responsive to selection by the customer of one of the plurality of transaction keys and entry of data identifying a specific one of said plurality of institutions for processing a transaction step represented by the selected transaction key in accordance with the key state assigned to the selected transaction key by the keyboard control data block located by said first locating means, said first transaction processing means including means for processing the transaction step represented by the selected key at the terminal when the selected key has a first key state assigned thereto and means for distributing processing of the transaction step represented by the selected key between said terminal and said host data processing system when the selected key has a second key state assigned thereto; and the host data processing system comprises;

second transaction processing means for processing part of the transaction step when the selected key has said second key state assigned thereto;

whereby the processing at said terminal of transaction keys activiated by said customer of a specific institution to select transaction steps is performed in accordance with respective key states assigned to said transaction keys by said specific institution via the communication port means from said host data processing system.

7. The terminal and host data processing system of claim 6, the host data processing system further comprising:

second storage means in said host data processing system for storing respective keyboard control data blocks corresponding to each of the plurality of institutions; and second locating means responsive to failure of said first locating means to find a keyboard control data block corresponding to said specific institution in said first storage means for locating the corresponding keyboard control data block in said second storage means for communication to said first storage means.

* * * * *